US009043360B2

(12) United States Patent  (10) Patent No.: US 9,043,360 B2
Fang et al.  (45) Date of Patent: May 26, 2015

(54) DISPLAY ENTITY RELATIONSHIP

(75) Inventors: Lujun Fang, Ann Arbor, MI (US); Anish Das Sarma, San Francisco, CA (US); Cong Yu, Hoboken, NJ (US); Philip Bohannon, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 443 days.

(21) Appl. No.: 12/972,179

(22) Filed: Dec. 17, 2010

(65) Prior Publication Data

US 2012/0158687 A1  Jun. 21, 2012

(51) Int. Cl.
*G06F 17/30* (2006.01)
*G06N 5/02* (2006.01)

(52) U.S. Cl.
CPC ............ *G06N 5/02* (2013.01); *G06F 17/30539* (2013.01); *G06F 17/30696* (2013.01)

(58) Field of Classification Search
CPC ................... G06F 17/30539; G06F 17/30696; G06N 5/02
USPC .......................................... 707/603, 776, 706
See application file for complete search history.

(56) References Cited

U.S. PATENT DOCUMENTS

| 5,999,192 | A * | 12/1999 | Selfridge et al. | 345/440 |
| 8,019,752 | B2 * | 9/2011 | Ferrari et al. | 707/722 |
| 2010/0161662 | A1 * | 6/2010 | Jonas et al. | 707/780 |
| 2010/0192093 | A1 * | 7/2010 | Isozu et al. | 715/810 |
| 2010/0332475 | A1 * | 12/2010 | Birdwell et al. | 707/737 |
| 2011/0037766 | A1 * | 2/2011 | Judy et al. | 345/440 |

OTHER PUBLICATIONS

Shou-de Lin & Hans Chalupsky, "Unsupervised Link Discovery in Multi-Relational Data Via Rarity Analysis", IEEE ICDM (2003).*
Nicoleta Preda et al., "ANGIE: Active Knowledge for Interactive Exploration", ACM VLDB '09, Aug. 24-28, 2009, pp. 1570-1573.*
Lujun Fang et al., "Rex: Explaining Relationships Between Entity Pairs", Nov. 2011, Proceedings of the VLDB Endowment, 12 pages.*
Agrawal, S. et al.; "A System for Keyword-Based Search over Relational databases"; ICDE; 2002; pp. 1-12.
Al Khalifa, S. et al.; "Querying Structured Text in an XML Database"; ISGMOD, 2003; pp. 1-12.
Bhalotia, G. et al.; "Keyword Searching and Browsing in Database Using Banks", ICDE; 2002; pp. 1-10.
Bringmann, B. et al.; "What is Frequent in a Single Graph", PAKDD, 2008; pp. 1-4.
Cheng, J. et al.; "Efficient Processing of Group-Oriented Connection Queries in a Large Graph"; CIKM, 2009; pp. 1-4.
Cheng, J. et al.; "Fg-Index: towards Verification-free query Processing on Graph Database"; SIGMOD, 2007; pp. 1-12.
Faloutsos, C. et al.; "Fast discovery of Connection Subgraphs"; KDD, 2004; pp. 1-10.

(Continued)

*Primary Examiner* — Scott A Waldron
(74) *Attorney, Agent, or Firm* — Pillsbury Winthrop Shaw Pittman LLP

(57) ABSTRACT

Method, system, and programs for providing one or more explanations. An inquiry is received via a communication platform where the inquiry is about how a set of entities are related. Information is retrieved from a knowledge storage in accordance with the set of entities and such information describes a plurality of entities and relationships existing among the plurality of entities. Based on such retrieved information, one or more explanations with respect to each relationship by which the set of entities are connected are generated. The one or more explanations are then transmitted as a response to the inquiry.

23 Claims, 22 Drawing Sheets

(56) References Cited

OTHER PUBLICATIONS

Garey, M. et al.; "Computers and Intractability: A Guide to the Theory of NP-Completeness"; W. H. Freeman, 1979; pp. 1.

He, H. et al.; "Ranked Keyword Searches on Graphs"; SIGMOD, 2007; pp. 1-12.

Hristidis, V. et al.; "Efficient IR-style keyword Search Over Relational Databases"; VLDB; 2003; pp. 1-32.

Hristidis, V. et al.; "Discover: Keyword search in Relational Databases"; VLDB; 2002; pp. 1-12.

Kasneci, G. et al.; "Ming: Mining Informative Entity Relationship Subgraphs"; CIKM, 2009; pp. 1-4.

Luo, G. et al.; "Answering Relationship Queries on the Web"; WWW, 2007; pp. 1-10.

Luo, Y. et al.; "Spark: Top-k Keyword query in relational Databases", SIGMOD, 2007; pp. 1-12.

Ramakrishnan, C. et al.; "Discovering Informative Connection Subgraphs in Multi-relational Graphs"; SIGKDD Explorations, 2005.

Shafah, D., et al.; "Connecting the Dots Between News Articles"; KDD, 2010, pp. 1-10.

Sozio, M. et al.; "The Community Search Problem and How to Plan a Successful Cocktail Party"; KDD< 2010; pp. 1-10.

Tong, H. et al.; "Center-piece Subgraphs: Problem Definition and Fast Solutions", KDD 2006; pp. 404-413.

Ullman, J. D.; "Principles of Dtabase and Knowledge-base Systems"; vol. 1, Computer Science Press, 1988; pp. 391-412.

Yan, X. et al.,; "gspan: Graph-based Substructure Pattern Mining"; ICDM, 2002; pp. 1-4.

Yan, X. et al.; "Closegraph Mining Frequent Graph Patterns", KDD, 2008.

\* cited by examiner

DISPLAY ENTITY RELATIONSHIP

BACKGROUND

1. Technical Field

The present teaching relates to methods, systems and programming for identifying information based on content. Particularly, the present teaching is directed to methods, systems, and programming for providing explanations for relationships.

2. Discussion of Technical Background

The advancement in the world of the Internet has made it possible to make a tremendous amount of information accessible to users located anywhere in the world. With the explosion of information, new issues have arisen. First, much effort has been put in organizing the vast amount of information to facilitate the search for information in a more effective and systematic manner. Along that line, different techniques have been developed to automatically or semi-automatically categorize content on the internet into different topics and organize them in an, e.g., hierarchical fashion. Imposing organization and structure on content has led to more meaningful search and promoted more targeted commercial activities. For example, categorizing a piece of content into a class with a designated topic or interest often greatly facilitates the selection of advertisement information that is more on the point and relevant.

Another important issue has to do with how to identify useful information out of massive amounts of available content in order to link different pieces of information in a more meaningful manner. For example, effort has been spent towards identifying relationships among different entities, whether individuals or business organizations, as well as events that give rise to various relationships among such entities. To achieve that, content can be analyzed and various types of information can be abstracted through such analysis. Such identified relationships are usually individual relationships. In addition, existing approaches to detecting relationships merely provide a list of entities who are considered to be related to an entity in question. Although helpful, it is often a mystery to a viewer as to why and how particular two entities are related.

In addition, the same pairs of entities may be related in different ways, e.g., the same people may be related in different capacities. For instance, Brad Pitt and Angelina Jolie are related both as domestic partners privately and as co-starring actors professionally. Conventional approaches focus only on identifying individual relationships without providing any indication as to in how many different ways are two entities are related. Furthermore, each relationship, e.g., co-worker, is an abstracted concept, which does not provide, in and of itself, any detailed or real life information that can be used to explain each particular instances of the relationship. Hence, existing solutions to relationship detection, although useful in certain situations/applications, do not address the issue of providing explanations as to the nature of a given relationship or how given entities are related in real life in a multi-faceted way. Therefore, there is a need to develop techniques to create concrete explanations for suggested relationships existing among different entities based on accessible information.

SUMMARY

The teachings disclosed herein relate to methods, systems, and programming for content processing. More particularly, the present teaching relates to methods, systems, and programming for providing explanations for relationships.

In one example, a method, implemented on a machine having at least one processor, storage, and a communication platform connected to a network for providing one or more explanations, is disclosed. An inquiry is first received, via the communication platform, which inquires how a set of entities are related. A knowledge retrieval unit retrieves information from a knowledge database based on the set of entities. The retrieved information records a plurality of entities and relationships among the entities. Based on the retrieved information, an explanation generation unit generates one or more explanations for each relationship by which the set of entities are connected. Such generated one or more explanations are then transmitted as a response to the inquiry.

In another example, a method, implemented on a machine having at least one processor, storage, and a communication platform connected to a network, for providing one or more explanations is disclosed. An inquiry is received, from a search engine via the communication platform, inquiring about how a set of entities are related. The inquiry is generated based on a query result provided by the search engine. A knowledge retrieval unit retrieves information that records a plurality of entities and relationships existing among the plurality of entities. An explanation generation unit generates one or more explanations for each relationship by which the set of entities are connected based on the retrieved information and such generated explanations are transmitted to the search engine as a response to the inquiry.

In a different example, a method, implemented on a machine having at least one processor, storage, and a communication platform connected to a network, for providing explanations is disclosed. In this example, an inquiry from a user about how a set of entities are related is received via the communication platform. The inquiry from the user is issued based on content accessible to the user and the set of entities are identifiable from the content. Information related to the set of entities is retrieved, where the information records a plurality of entities and relationships among the plurality of entities. One or more explanations are then generated based on the retrieved information for each relationship by which the set of entities are connected and such generated one or more explanations are then transmitted to the user as a response to the inquiry.

In yet another example, a method, implemented on a machine having at least one processor, storage, and a communication platform connected to a network for a search engine, is disclosed. A query from a user is received via the communication platform. The search engine searches for content based on the query and sends the retrieved content to the user as a response to the query. The search engine then receives an inquiry from the user about how a set of entities, identifiable from the content, are related. The inquiry is sent to a relationship explanation engine that is configured to provide explanations for relationships existing among entities based on information relating to the entities. The search engine then receives, from the relationship explanation engine, one or more representations of explanations, each of which includes at least one of an explanation, a description of the explanation, and a measure indicating the interestingness of the explanation, and transmits the one or more representations of explanations to the user as a response to the inquiry.

In another different example, a method, implemented on a machine having at least one processor, storage, and a communication platform connected to a network for a search engine capable of providing explanations, is disclosed. A query from a user is received via the communication platform. The search engine searches for content based on the query and sends the retrieved content to the user as a response to the query. The search engine then receives an inquiry from the user about how a set of entities, identifiable from the content, are related. Information that records a plurality of entities and relationships existing among the plurality of entities is retrieved in accordance with the set of entities. Based on the retrieved information, one or more explanations are generated for each relationship by which the set of entities are connected. Such generated explanations are then transmitted to the user as a response to the inquiry In a different example, a system for providing explanations is disclosed. The system includes an inquiry processing unit, a knowledge retrieval unit, an explanation generation unit, and a communication platform. The inquiry processing unit is configured for receiving and processing an inquiry about how a set of entities are related. The knowledge retrieval unit is configured for retrieving information from a knowledge database in accordance with the set of entities, wherein the information records a plurality of entities and relationships among the plurality of entities. The explanation generation unit is configured for generating one or more explanations for each relationship by which the set of entities are connected based on the retrieved information, and the communication platform is configured for connecting to a network to transmit the one or more explanations as a response to the inquiry.

In yet another different example, a system for providing explanations for relationships is disclosed. The system includes a search engine for providing query content obtained based on a query from a user and a relationship explanation engine for providing one or more explanations about how a set of entities, identifiable in the query content, are related. The relationship explanation engine, upon receiving an inquiry about how a set of entities, identified from the query content, are related, retrieves information from a knowledge storage in accordance with the set of entities, wherein the information records a plurality of entities and relationships among the plurality of entities, generates one or more explanations for each relationship by which the set of entities are connected based on the retrieved information, and transmits the one or more explanations as a response to the inquiry.

Other concepts relate to software for implementing the generation of explanations for relationships. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine readable and non-transitory medium having information recorded thereon for providing explanations, where when the information is read by the machine, causes the machine to receive an inquiry about how a set of entities are related, retrieve information from a knowledge database in accordance with the set of entities, wherein the information records a plurality of entities and relationships among the plurality of entities, generate one or more explanations for each relationship by which the set of entities are connected based on the retrieved information, and transmit the one or more explanations as a response to the inquiry.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to providing explanations for relationships existing among different entities, which can be any identifiable entities such as individuals, organizations, or business units. Based on an inquiry directed to, e.g., how two entities are related, information from certain data sources, e.g., structured or semi-structured data sources, is retrieved and analyzed to identify instances of different types of relationships existing between the two entities. Each identified instance of a specific relationship constitutes an explanation and may then be further processed to obtain a more detailed description of the explanation. FIGS. 1(a)-1(d) illustrate examples of relationship explanation in an online information search application in accordance with the present teaching.

Figure 1A:
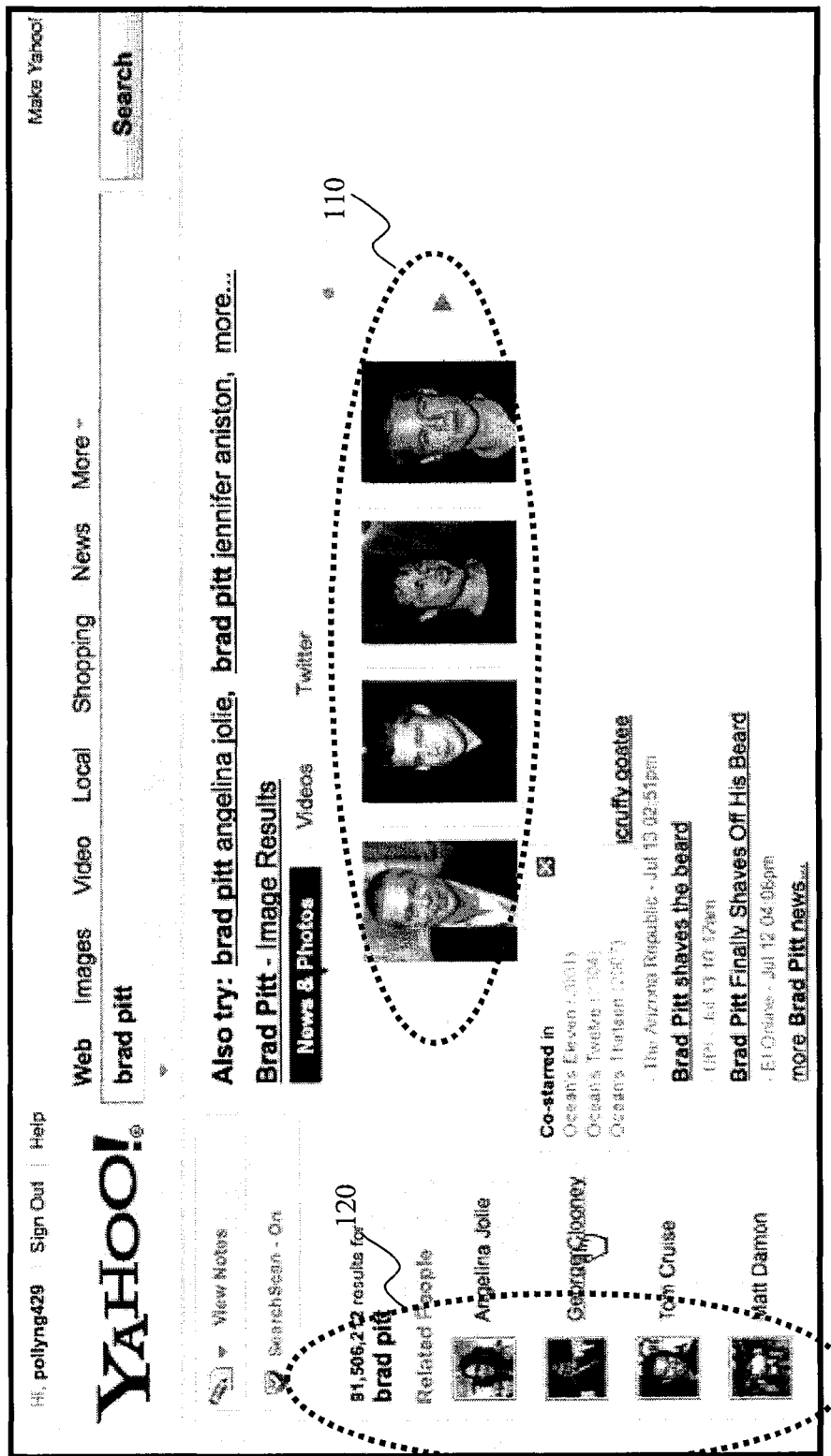
FIGS. 1(a)-1(d) illustrate examples of relationship explanation in an online information search application in accordance with the present teaching.
Figure 1B:
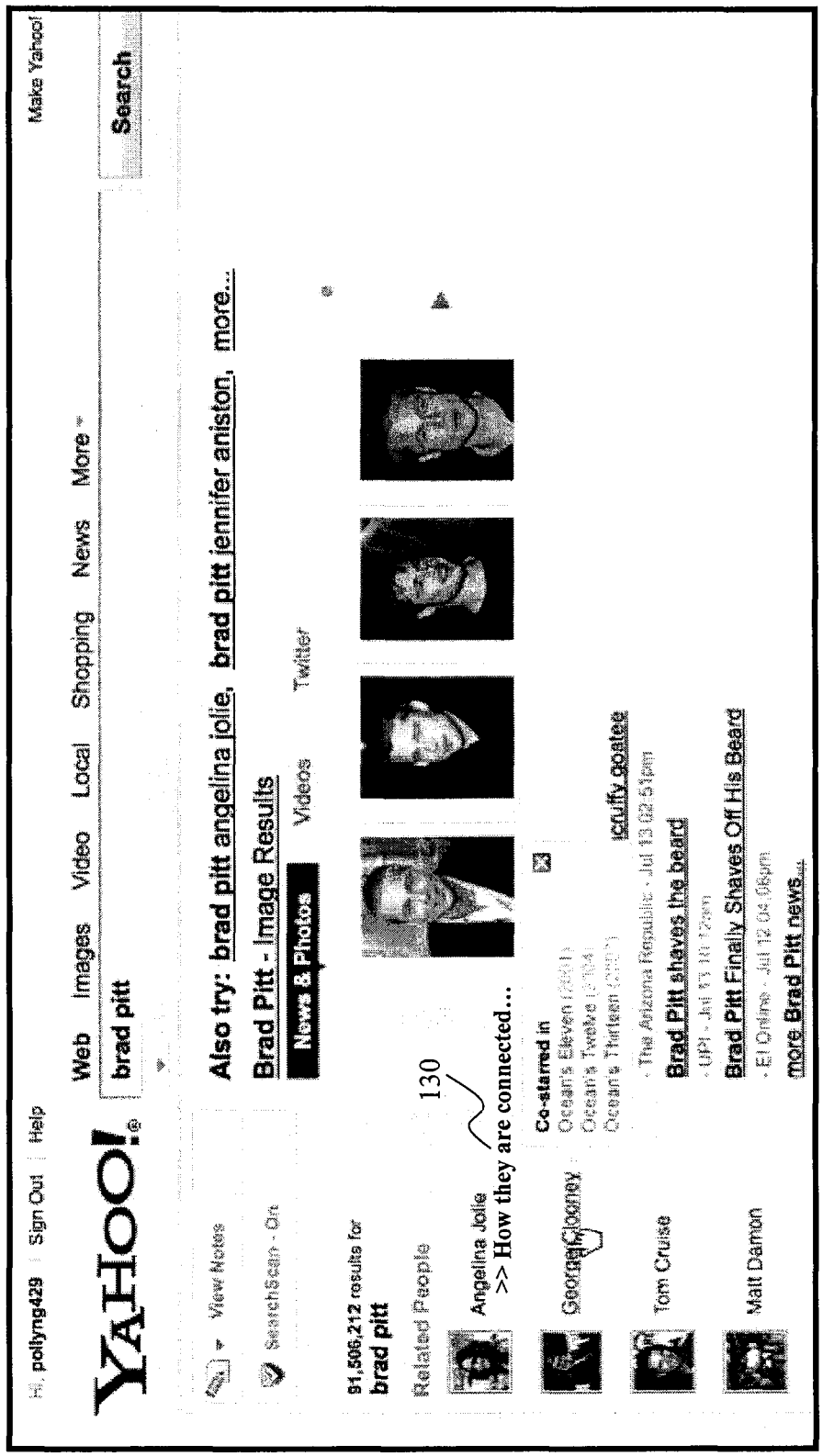
Figure 1C:
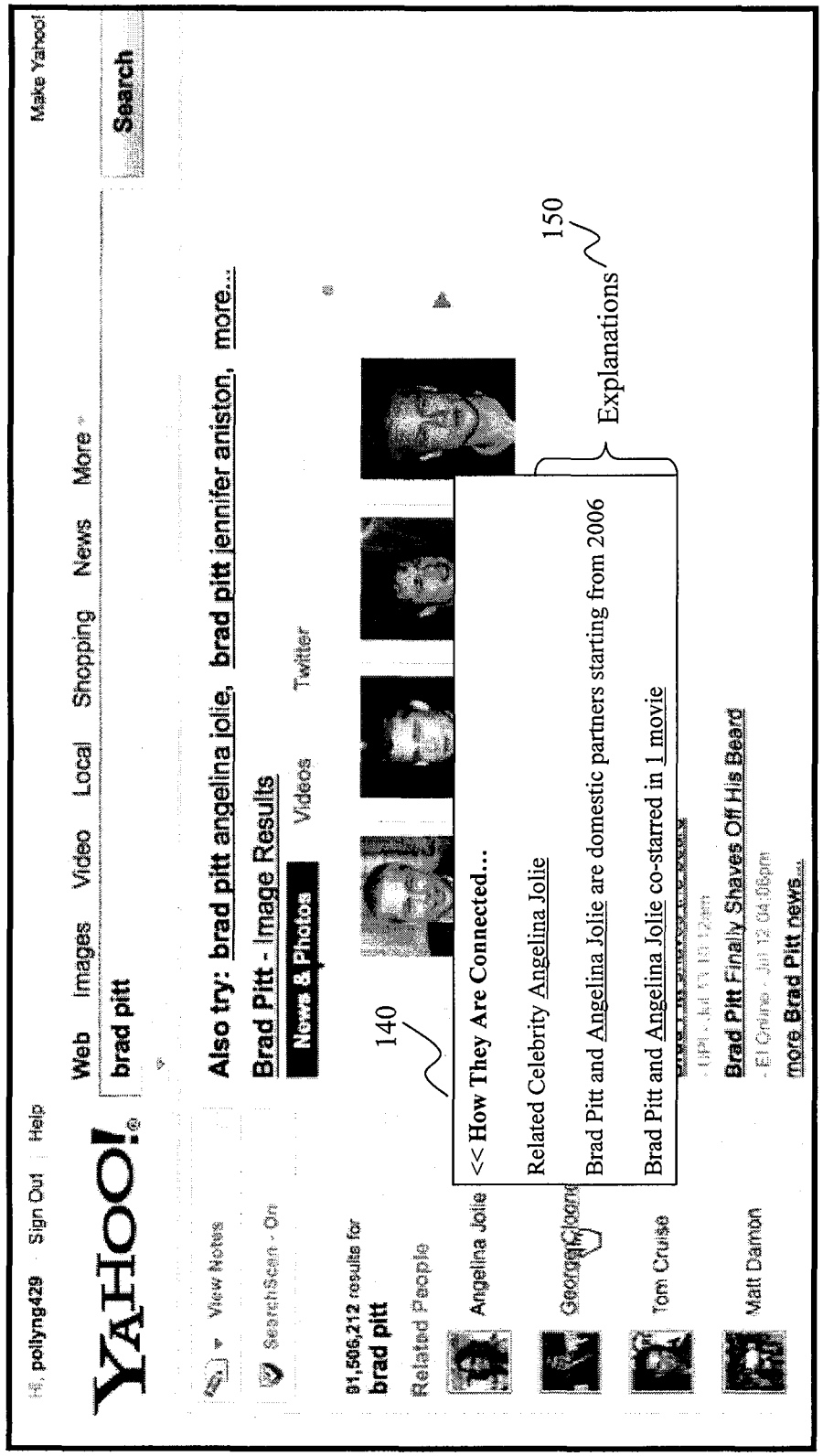
Figure 1D:
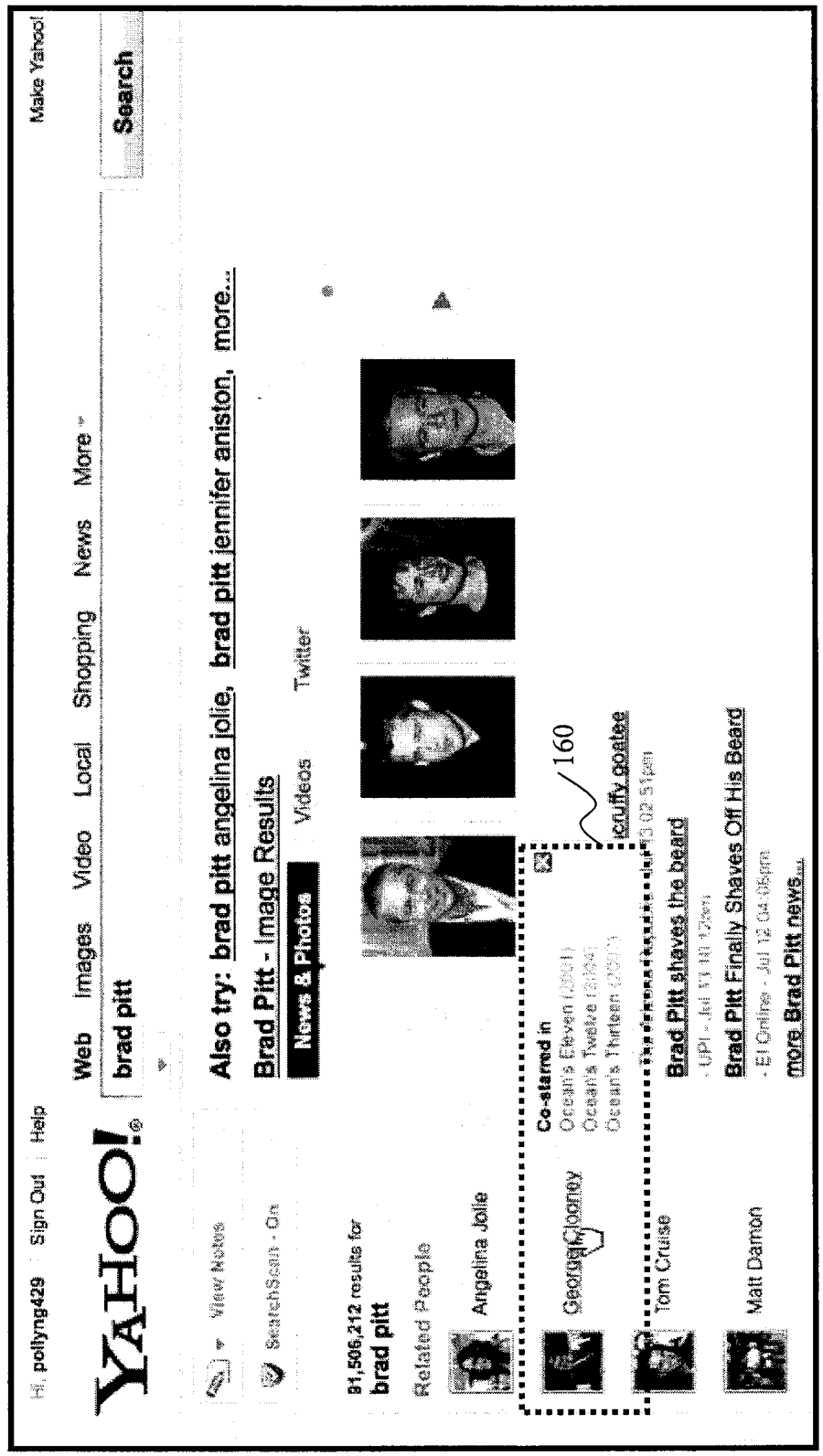

In FIG. 1(a), a query about "Brad Pitt" produces a result page, in which image results of the query are presented in 110 in the center of the page. Additionally, there is a list of individuals, who are considered to be related to "Brad Pitt", presented in the left portion 120 of the page with photos of such individuals. As can be seen, those related individuals include Angelina Jolie, George Clooney, Tom Cruise, Matt Damon, etc. Although these people are listed as "related", there is no explanation as to how they are related on the page shown in FIG. 1(a). The present teaching allows a user to further inquire about how each of such individuals is related to Brad Pitt. For example, under each person's name, a user may further activate, e.g., by right clicking on the name of the person, a specific tool for seeking a more detailed explanation as to how this person is related to Brad Pitt. This is illustrated in FIG. 1(b), in which under the name of "Angelina Jolie", a specific selectable item may correspond to the inquiry "How they are connected . . . " (shown as 130). To send this inquiry, a user may, e.g., via a left click on the mouse when this item is highlighted (there may be multiple choices when a user right clicks the mouse under a name). FIG. 1(c) shows an exemplary result in a, e.g., pop-out window 140, in which two explanations (150) are provided that indicate that Brad Pitt and Angelina Jolie are domestic partners since 2006 and, in addition, Brad Pitt and Angelina Jolie co-starred in one movie. FIG. 1(d) illustrates another example in which an inquiry about how Brad Pitt and George Clooney are related results in the explanation as shown in 160. As can be seen, Brad Pitt and George Clooney are related because they co-starred in three movies in different years.

Figure 2:
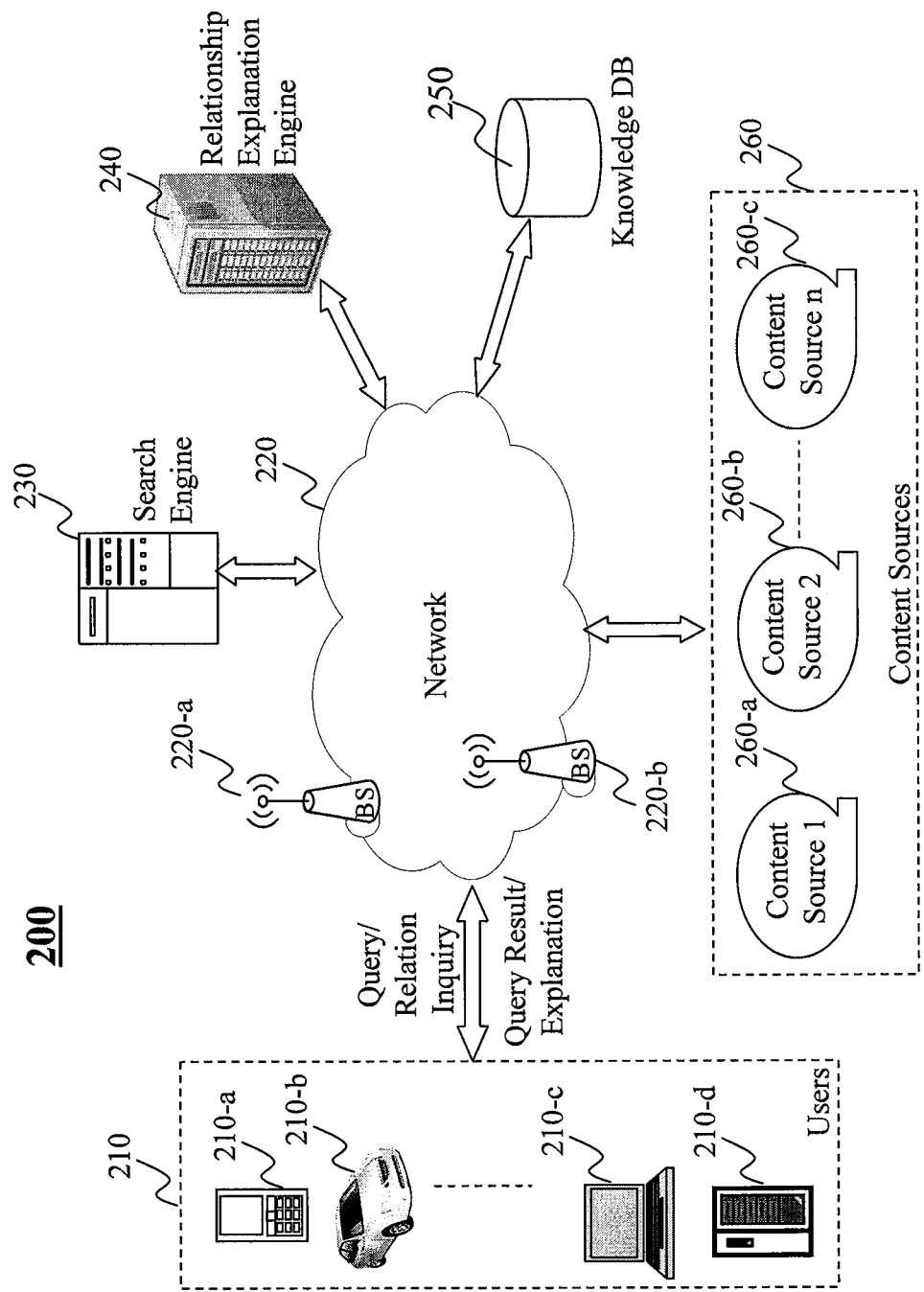
FIG. 2 is a high level depiction of an exemplary system in which relationship explanation is applied, according to a first application embodiment of the present teaching.

FIG. 2 is a high level depiction of an exemplary system 200 in which a relationship explanation engine 240 is deployed to provide relationship explanations, according to a first application embodiment of the present teaching. The exemplary system 200 includes users 210, a network 220, a search engine 230, content sources 260, a relationship explanation engine 240, and a knowledge database 250. The network 220 in system 200 can be a single network or a combination of different networks. For example, a network can be a local area network (LAN), a wide area network (WAN), a public network, a private network, a proprietary network, a Public Telephone Switched Network (PSTN), the Internet, a wireless network, a virtual network, or any combination thereof. A network may also include various network access points, e.g., wired or wireless access points such as base stations or Internet exchange points 220-a, . . . , 220-b, through which a data source may connect to the network in order to transmit information via the network.

Users 210 may be of different types such as users connected to the network via desktop connections (210-d), users connecting to the network via wireless connections such as through a laptop (210-c), a handheld device (210-a), or a built-in device in a motor vehicle (210-b). A user may send a query to the search engine 230 via the network 220 and receive a query result from the search engine 230 through the network 220. Based on the query result, as illustrated in FIG. 1(a), a user may further inquire about how people who are connected as shown in the search result are related. The inquiry about the relation explanation is also sent to the network 220 and is directed to the relationship explanation engine 240, which will analyze the information available, e.g., information in the knowledge database 250 and content sources 260, to derive explanations for relations existing between or among different people. Such relation explanations are then sent from the relationship explanation engine 240 to the user at 210 via the network 220.

The content sources 260 include multiple content sources 260-a, 260-b, 260-c. A content source may correspond to a web page host corresponding to an entity, whether an individual, a business, or an organization such as USPTO.gov, a content provider such as cnn.com and Yahoo.com, or a content feed source such as tweeter or blogs. Both the search engine 230 and the relationship explanation engine 240 may access information from any of the content sources 160-a, 160-b, . . . , 160-c and rely on such information to respond to a query (e.g., the search engine 230 identifies content related to keywords in the query and returns the result to a user) or provide explanations for relationships among entities. The relationship explanation engine 240 may also access additional information, via the network 220, stored in the knowledge database 250, which may contain, e.g., structured information such as information about certain entities and events that link different entities together, etc. The information in the knowledge database 250 may be generated by one or more different applications (not shown), which may be running on the search engine 230, at the backend of the search engine 230, or as a completely stand-alone system capable of connecting to the network 220, accessing information from different sources, analyzing the information, generating structured information, and storing such generated information in the knowledge database 250.

In the exemplary system 200, a user may initially send a query about an entity (e.g., "Brad Pitt") to the search engine 230 to obtain information related to the entity. When the user receives the query result (e.g., the content as shown in FIG. 1(a)), which may contain other entities related to the entity in question, the user may further inquire about how a specific entity is related to the entity in question. In some embodiments, this further inquiry about how two entities are related may be first sent to the search engine 230 and then re-directed to the relationship explanation engine 240, if the search engine 230 operator contracts with the operator of the relationship explanation engine 240. In such a configuration, the relationship explanations output from the relationship explanation engine 240 may be sent back to the search engine 230 so that they can be re-directed to the user as a response to the inquiry. Alternatively, the relationship explanation engine 240 may return the explanations directly back to the user, if the user's information is, e.g., forwarded to the relationship explanation engine 240 when the inquiry is re-directed. In some embodiments, a browser running on a user's device may send a user's inquiry about how two entities are related directly to the relationship explanation engine 240. In this case, the communications between the user and the relationship explanation engine 240 do not go through the search engine 230. In such a configuration, the browser running on a user's device is configured to appropriately direct different inquiries to different systems via the network 220.

Figure 3:
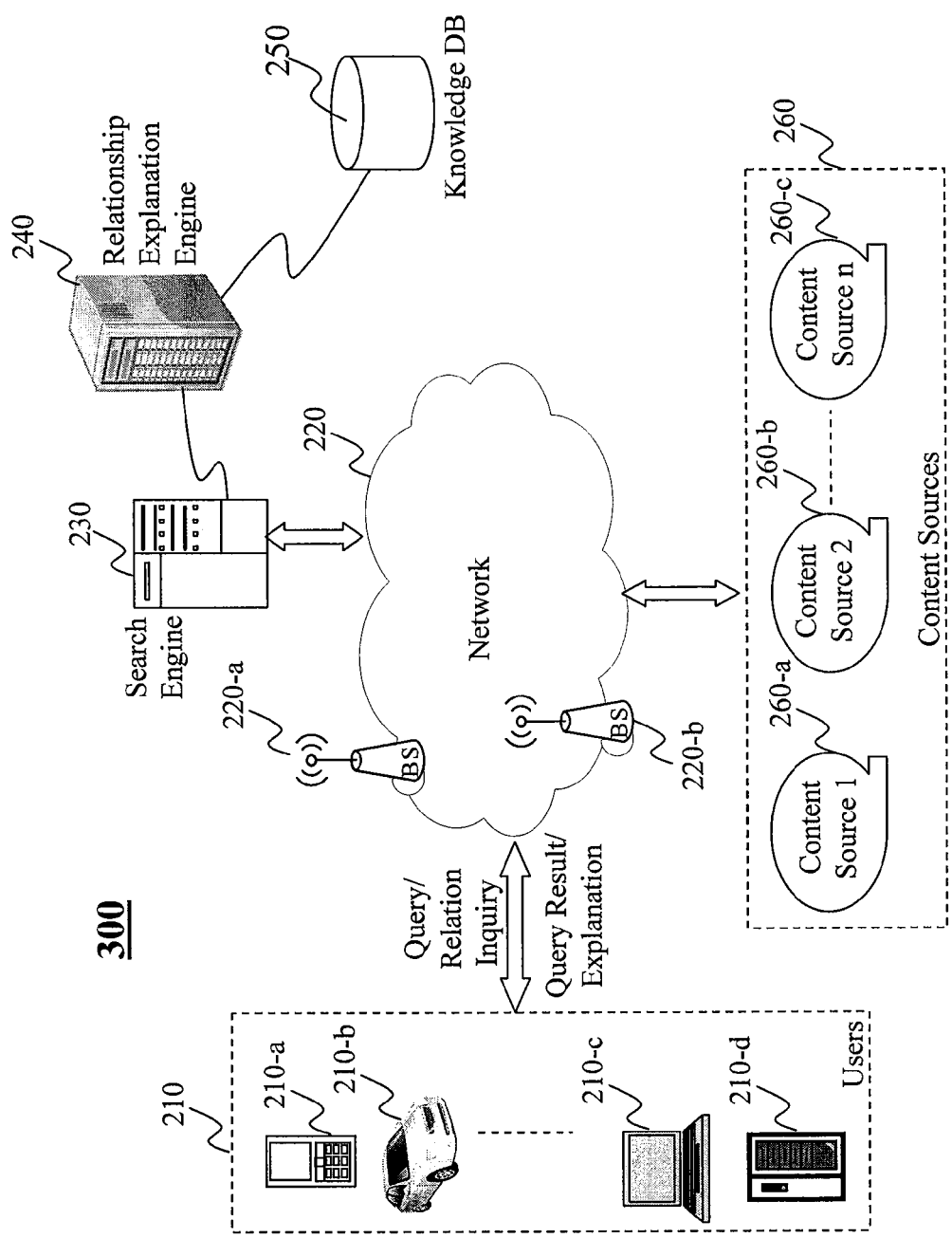
FIG. 3 is a high level depiction of an exemplary system in which relationship explanation is applied, according to a second application embodiment of the present teaching.

FIG. 3 is a high level depiction of an exemplary system 300 in which a relationship explanation engine is deployed to provide relationship explanations, according to a second application embodiment of the present teaching. In this embodiment, the relationship explanation engine 240 serves as a backend system of the search engine 230. All inquiries, including the query for content and the inquiry about how multiple entities are related are sent to the search engine 230, which then invokes the relationship explanation engine 240 to process the explanation processing.

Figure 4A:
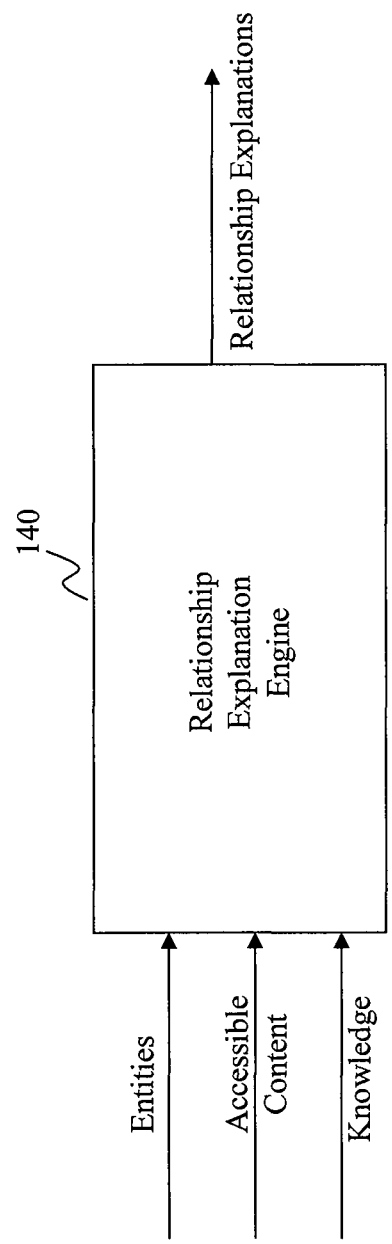
FIG. 4(a) depicts a relationship explanation engine with inputs and output, according to an embodiment of the present teaching.

FIG. 4(a) depicts the inputs and output of the relationship explanation engine 240, according to an embodiment of the present teaching. The relationship explanation engine 240 takes the inquiry from a user which indicates the entities for which explanation(s) for their relationship(s) is sought as input, as shown. In addition, the relationship explanation engine 240 also takes additional information such as content accessible from the network and structure information from the knowledge database 250 as inputs. By analyzing the input content/information, the relationship engine 240 identifies any connections between the entities at issue and generates an explanation, as output, for each of the relationships existing between the given entities.

Figure 4B:
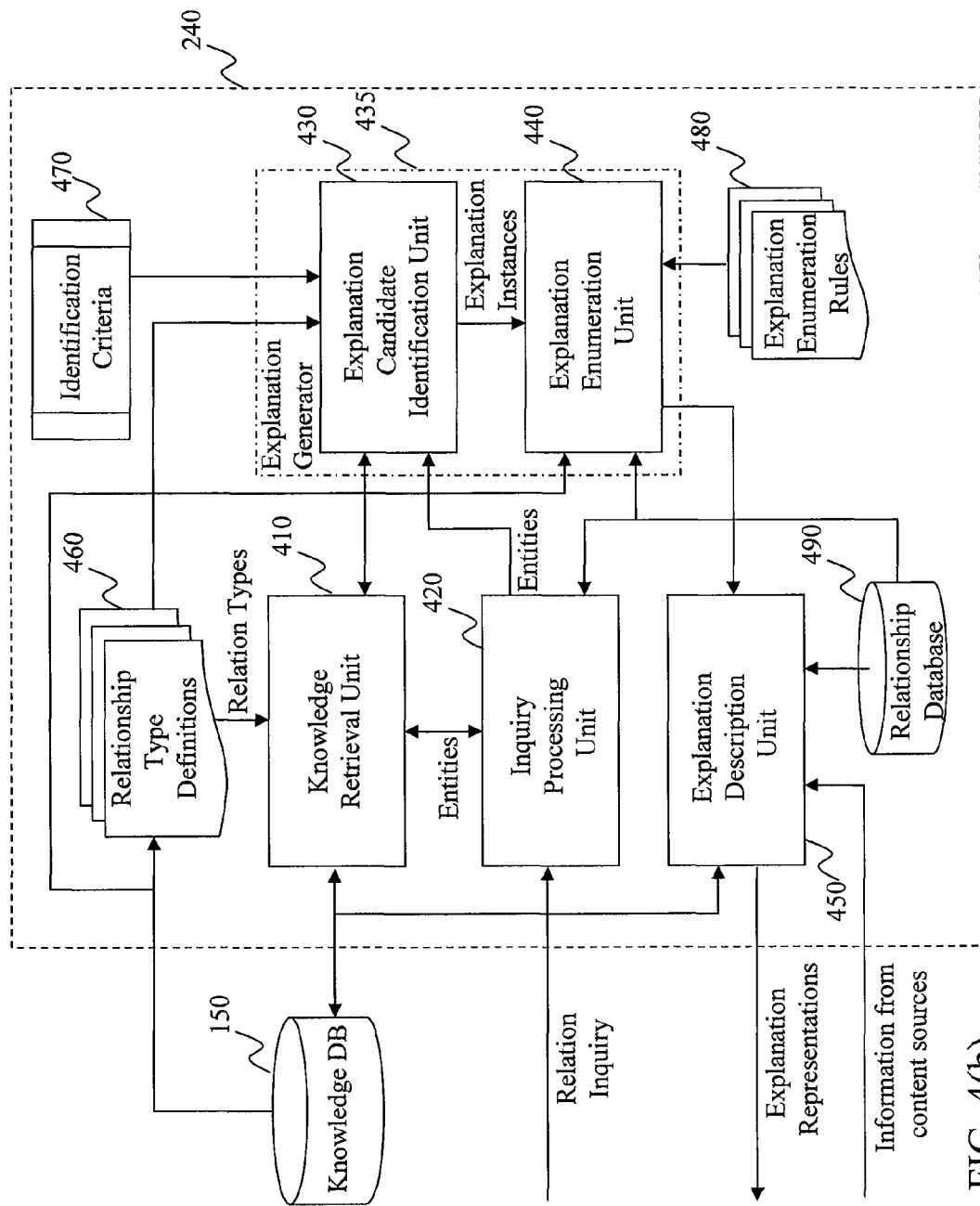
FIG. 4(b) depicts a high level exemplary system diagram of a relationship explanation engine, according to an embodiment of the present teaching.

FIG. 4(b) depicts a high level exemplary system diagram of the relationship explanation engine 240, according to an embodiment of the present teaching. As seen, the relationship explanation engine 240 includes an inquiry processing unit 420, a knowledge retrieval unit 410, an explanation generator 435, and an explanation description unit 450. The inquiry processing unit 420 processes a received inquiry on how multiple entities are related. The explanation generator 435 receives information related to the entities, retrieved by a knowledge retrieval unit 410 from the knowledge database 250, and determines how many instances of relationships exist between the entities. For each instance of a type of relationship, the explanation generator 435 generates an instance of an explanation for that type of relationship. Such generated instances of explanations are then sent to the explanation description unit 450, which, for each explanation, generates a representation for the explanation with additional descriptive information to be used to give a detailed explanation of the underlying relationship to a user.

An inquiry about relationship(s) of different entities is received by the inquiry processing unit 420. As discussed herein, the inquiry includes information about entities for which explanations of their relationships are sought. The inquiry processing unit 420 analyzes the inquiry and extracts the entities in question. In some embodiments, the extracted entities may be used to retrieve information, e.g., from the knowledge database 250 through the knowledge retrieval unit 410, regarding, e.g., the professions of the entities. In some embodiments, such information regarding the entities may be obtained from the inquiry itself. In some embodiments, the information regarding the entities may be used to acquire additional information to determine how the entities are related. For example, if the entities are known to be movie stars, this piece of information may be used to control the knowledge retrieval unit 410 to retrieve information only related to people in the movie industry.

Figure 6B:
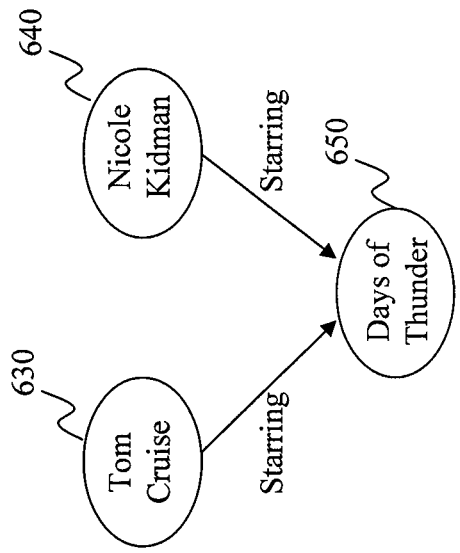
FIGS. 6(a)-6(c) show exemplary instantiated instances of abstract representation for relationships, according to an embodiment of the present teaching.

In some embodiments, in the knowledge database 250, relevant known information may be stored in certain representations to reflect the underlying knowledge. For instance, if two people are known to act in the same movie, they are related by a relationship, e.g., called "co-starring". One possible representation about this knowledge is a graph, e.g., a graph in which two links labeled by "starring" connecting two nodes representing two actors to the same node representing a movie. One example is shown in FIG. 6(b), in which a graph is used to represent a co-starring relationship. As shown, there are three nodes, two representing Tom Cruise and Nicole Kidman, respectively, and one node representing movie with title "Days of Thunder". Both nodes representing the actors are linked to the node representing the movie in which they co-starred. The links between a node representing an actor and a node representing a movie is labeled with "starring". There may be other types of relationships existing among entities and they can also be represented as either simpler or more complex graphs.

The entities extracted from the inquiry and information regarding the entities, e.g., profession of the entities, may be forwarded to the knowledge retrieval unit 410 so that knowledge related to the entities can be retrieved (from the knowledge database 250). For example, if two entities in question are Tom Cruise and Nicole Kidman, a search of the knowledge database 250 may be restricted to a sub-database devoted to entities in the movie industry based on the fact (e.g., analyzed by the inquiry processing unit) that both are movie stars. Such a search result may correspond to a complex graph, which includes a sub-graph as shown in FIG. 6(b), indicating that Tom Cruise and Nicole Kidman co-starred in movie "Days of Thunder". Such a search result may also include relationships between either Tom Cruise or Nicole Kidman and others, e.g., Tom Cruise is also related to Brad Pitt and George Clooney because they played in movies together. But such other relationships may or may be related to the inquiry. Thus, the result yielded by retrieving the knowledge database 250 needs to be further processed in order to identify the relationships between Tom Cruise and Nicole Kidman.

A graph may represent various simple and complex relationships. Some relationship represented in a graph is simple or direct, e.g., Tom Cruise and Nicole Kidman are directly related as a couple (see FIG. 6(a) where there is a direct link labeled "spouse" between the two entities), or more complex and indirect, e.g., Tom Cruise and Nicole Kidman co-starred in the same movie (see FIG. 6(b) where no direct link between Tom Cruise and Nicole Kidman). To identify an explanation of a relationship between two entities is to identify sub-graphs in a graph, each of which connects the two nodes representing the two entities. That is, such a sub-graph is a path, along which one can traverse from a node representing the first entity to a node representing the second entity. Any graph matching algorithms/techniques may be deployed to identify a sub-graph.

In addition, each node or link in a graph may be associated with a set of attributes describing the features that characterize the underlying node/link. Each node or link may also be weighted based on different criteria. For instance, a node representing an entity may be weighted based on, e.g., the fame of the entity. A link may be weighted based on, e.g., the closeness of the relationship (e.g., "spouse" may be a higher weighted relation than, e.g., "starring"). Based on a sub-graph, an explanation may be generated using, e.g., the structural information of the sub-graph as well as the attributes associated with the nodes and link(s) of the sub-graph. For example, based on sub-graph shown in FIG. 6(b), an explanation may read "Tom Cruise and Nicole Kidman co-starred in movie "Days of Thunder". If these two actors have co-starred in more than one movies, there will be multiple instances of sub-graphs, each has Tom Cruise and Nicole Kidman on the two nodes but with a different node representing a different movie. In this case, for each different instance, an explanation can be generated.

As discussed herein, weights may be assigned to either nodes or links in a graph. Such weights may be used in ranking the explanations. For example, if there are multiple (say 10) instances of co-starring relationships identified between Tom Cruise and Nicole Kidman, the explanation that "Tom Cruise and Nicole Kidman co-starred in 10 movies" derived based on the 10 instances may be ranked based on the weights assigned to the corresponding nodes or links in the corresponding sub-graphs. In this case, the weights to the two entities (Tom Cruise and Nicole Kidman) remain the same but the weights assigned to the movies in which they co-starred may be differ. In some embodiments, movies that are more popular may be assigned higher weights. In this case, the explanation instance that these two actors co-starred in a movie that has the highest weight may be ranked highest. In addition, weights assigned to links a graph may be determined based on the importance of the relationship that connect the two entities. For example, a weight assigned to relation "spouse" may be higher than that assigned to "co-starring") relation. In this case, if two people are related by both relations, the explanation on their spousal relationship has a higher ranking than the other. There are other ways to measure the interestingness of an explanation as will be discussed in more detail below.

Optionally, the knowledge retrieval unit 410 may also obtain information from a relationship database 490, where relationships dynamically detected based on dynamic events occurring in real life may be recorded. The relationships recorded in the relationship database 490 may also be represented in, e.g., a graph form. The difference between the knowledge stored in the knowledge database 250 and relationships stored in the relationship database 490 may include that the relationships stored in the latter are detected from dynamically occurring or transitory events, which may not persist over time. For example, the knowledge about Tiger Woods and Erin Nordegren are a couple may be recorded in the knowledge database 250 because it is a known relationship while the relationship between Tiger Woods and Rachel Uchitel may be just identified from a recent event (the sex scandal) which is transitory in nature but nevertheless represents a relationship between two entities. Such information may also be used to find explanation for certain inquiries.

The retrieved information related to the entities in question is then forwarded to the explanation generator 435, which first identifies, via an explanation candidate identification unit 430, candidate explanations and then optimizes the candidate explanations via an explanation enumeration unit 440. To identify explanation candidates, the explanation candidate identification unit 430 may base its processing on a number of criteria. For instance, a number of types of abstract relationships, stored in a storage 460, may be used to match against the retrieved information (e.g., graphs) to identify explanation candidates. The storage 460 may be configured with definitions of different types of relationships, which may be organized based on, e.g., professions. For example, for the acting profession, a set of relationship types may apply. Examples of relationships applicable to people in acting may include "starring", "direct", "produce", which link people in the acting profession according to their role in a performance, such as a movie, a play, a musical, etc. That is, when two people each have a relationship to the same performance, the two people can be said to be related to each other via "co-starring" by virtue of their shared relationships to that same performance. There may also be a set of generic relationship types applicable to all people, such as "married to", "is a child of", "work together with", etc. Based on the information about the entities, an appropriate set of abstract relationships may be used by the explanation candidate identification unit 430.

Figure 5B:
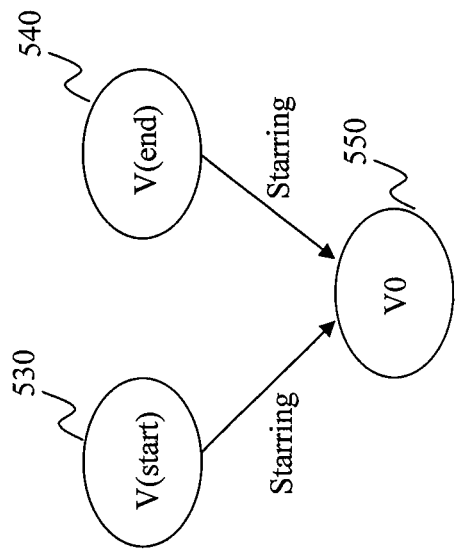
FIGS. 5(a)-5(c) show exemplary representations of abstract relationship types, according to an embodiment of the present teaching.
Figure 5A:
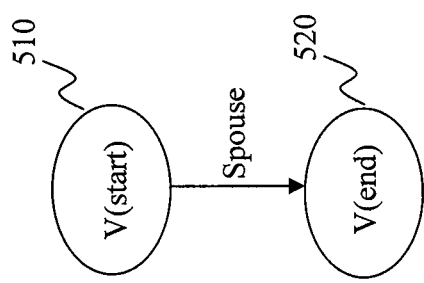
Figure 5C:
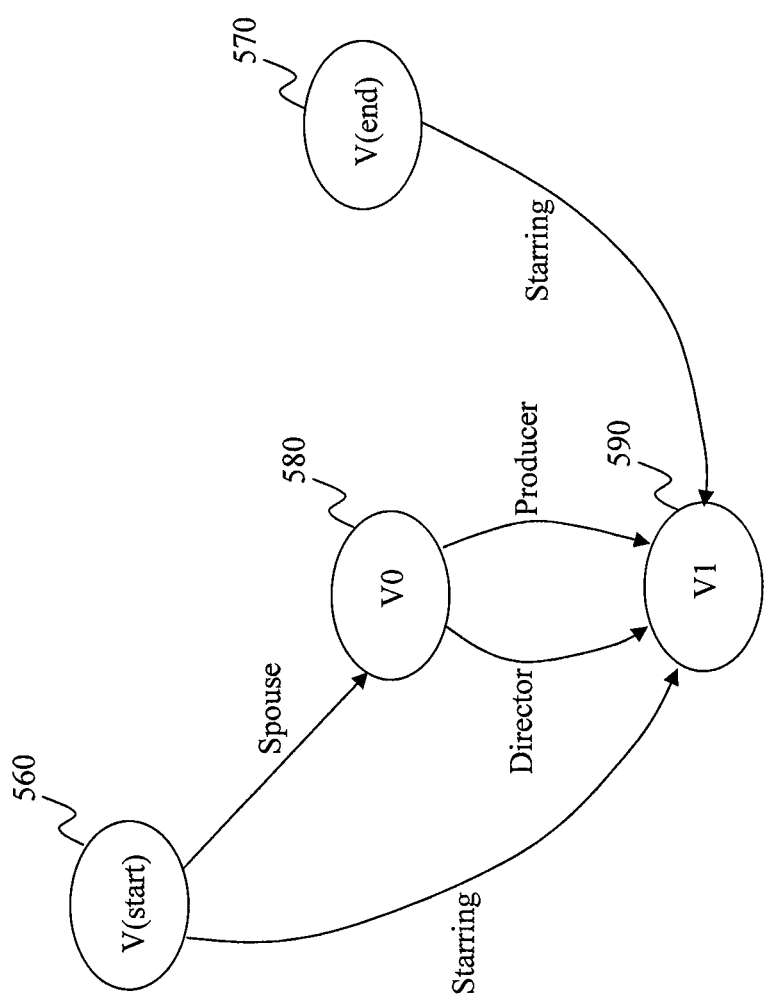

FIGS. 5(a)-5(c) show exemplary representations of abstract relationship types, according to an embodiment of the present teaching. Specifically, FIG. 5(a) illustrates a graph representation of abstract relationship type of "spouse". In this representation, the two nodes, V(start) 510 and V(end) 520, correspond to two abstract entities who are spouse to each other, indicated on the link connecting the two nodes. FIG. 5(b) shows a graph representation for the abstract relationship type of "co-starring", in which two top nodes, V(start) 530 and V(end) 540, corresponding to two abstract entities, who both star in a performance represented by a node labeled as V0 550, whether it is a play, a movie, a musical, or a concert. FIG. 5(c) shows a graph representation of a more complex compound relationship among three abstract entities, in which nodes 560 and 570 represents two entities who co-star in a performance represented by node V1 590 and entity 560 is the spouse of another entity V0 580, who is both the director and producer of the performance V1 590.

Figure 6A:
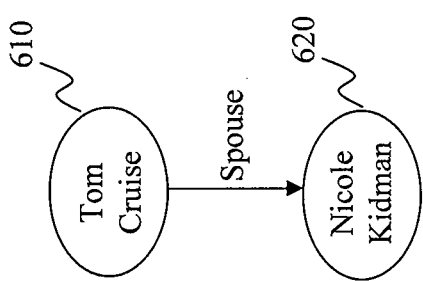
Figure 6C:
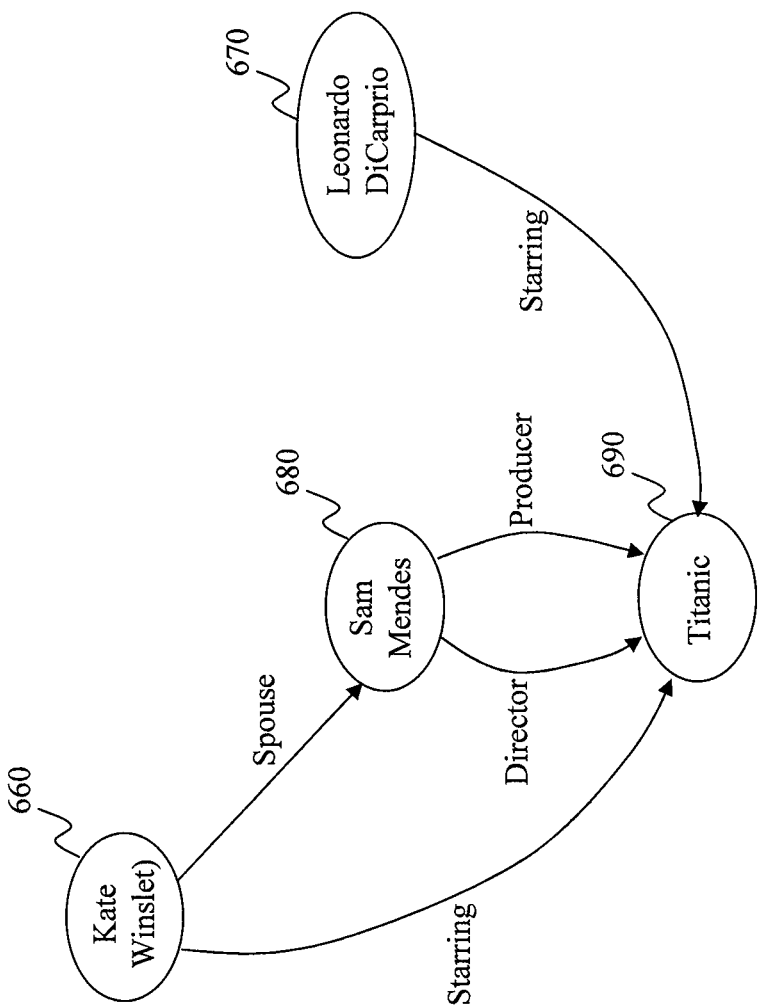

FIGS. 6(a)-6(c) show exemplary instantiated instances of abstract representations for relationships, according to an embodiment of the present teaching. The example in FIG. 6(a) is a representation of a real life relationship instantiated from the abstract relationship representation shown in FIG. 5(a). That is, Tom Cruise corresponds to instantiated node 610 and Nicole Kidman corresponds to instantiated node 620 and they are spouses. Similarly, the example in FIG. 6(b) is a representation of a real life relationship instantiated from the abstract relationship representation shown in FIG. 5(b). That is, Tom Cruise corresponds to instantiated node 630 and Nicole Kidman corresponds to instantiated node 640 and they co-starred in the movie "Days of Thunder" which corresponds to the instantiated node 650. The example in FIG. 6(c) is a representation of another real life relationship instantiated from the abstract relationship representation shown in FIG. 5(c). As shown, Kate Winslet corresponds to instantiated node 660, Leonardo DiCarprio corresponds to instantiated node 670, Sam Mendes corresponds to instantiated node 680, and movie "Titanic" corresponds to instantiated node 690. The instantiated graph as shown in FIG. 6(c) represents: Kate Winslet and Leonardo DiCarprio co-starred in the movie "Titanic", which was directed and produced by Kate Winslet's spouse Sam Mendes.

A graph built based on real life relationships among people may be much more complex than any of the examples shown here. Some graphs shown in FIGS. 5(a)-6(c) may correspond to a sub-graph in a bigger and more complicated graph, which links more people in different relationships. In FIG. 6(c), several sub-graphs can be extracted and they represent individual relationships. For example, node 660 and 680 and the link labeled as "spouse" is a sub-graph, representing a "spouse" relationship between Kate Winslet and Sam Mendes. Nodes 660, 670, and 690 and the links connecting them form another sub-graph representing the "co-starring" relationship between Kate Winslet and Leonardo DiCarprio in the movie "Titanic". Therefore, to identify relationship explanations is to extract one or more sub-graphs from one or more complicated graphs. For each such extracted sub-graph, there is an explanation based on the definition of the relationship type. For instance, FIG. 6(a) corresponds to a sub-graph (as shown above) representing a "spouse" relationship so that the explanation that can be derived based on this sub-graph may be "Tom Cruise and Nicole Kidman are spouses to each other". Alternatively, the explanation may be "Tom Cruise is the spouse of Nicole Kidman" or "Nicole Kidman is the spouse of Tom Cruise". An explanation for a relationship shown in FIG. 6(b) may be "Tom Cruise and Nicole Kidman co-starred in the movie 'Days of Thunder'".

Referring back to FIG. 4, when the explanation generator 435 receives the information retrieved from the knowledge database 250 (e.g., one or more complex graphs having instantiated nodes corresponding to the given entities in question), the explanation candidate identification unit 430 is to identify sub-graphs existing in the information received to yield one or more instances of explanations, each of which corresponds to one sub-graph. The process of identifying such sub-graphs may be controlled via different criteria. In some embodiments, the types of relationships sought may be determined based on the characteristics of the entities. For instance, if two entities are identified as movie stars, the relationship type "co-starring" may be used to seek a corresponding instantiated sub-graph. If two entities are identified as golf stars, the relationship type "co-starring" may not be used to identify instantiated instances from a more complex graph. In addition, the granularity of the sub-graph may also be a processing parameter. For instance, if a sub-graph like what is shown in FIG. 6(c) is extracted, it may need to be further processed because, as discussed herein, the sub-graph in FIG. 6(c) represents more than one relationship, which corresponds to more than one explanation.

Figure 7A:
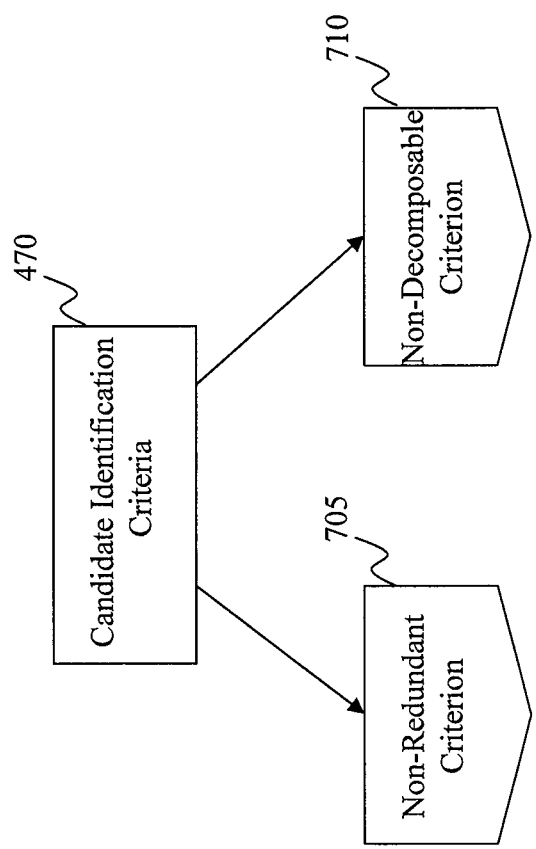
FIG. 7(a) provides exemplary types of constraints in identifying explanation candidates, according to an embodiment of the present teaching.
Figure 7B:
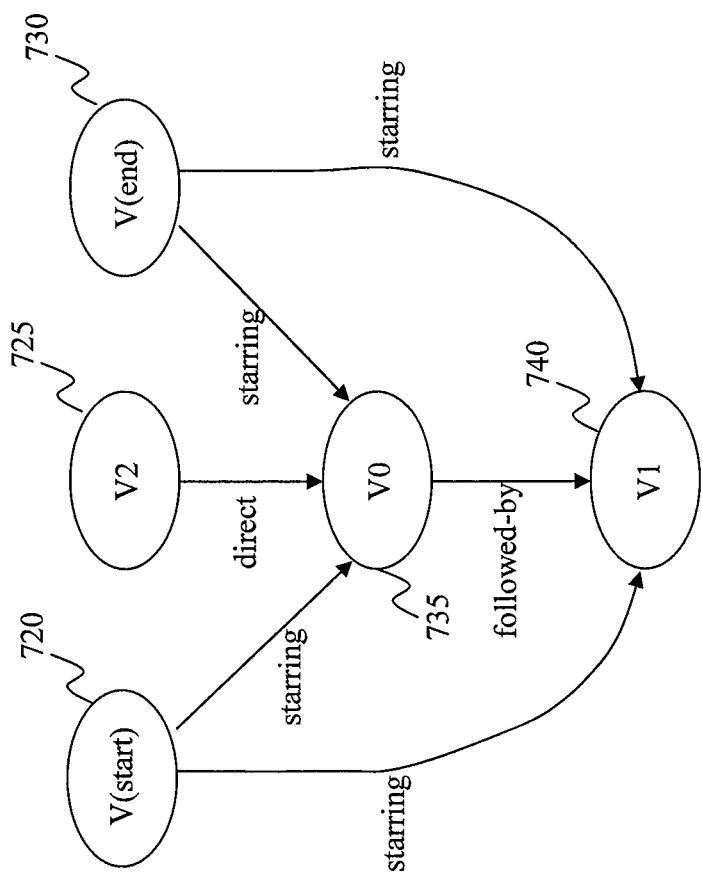
FIGS. 7(b)-7(c) illustrate examples of redundant and decomposable explanation candidates, according to an embodiment of the present teaching.

In some embodiments, additional criteria or constraints, configured and stored in storage 470, may be used to control how to extract sub-graphs so that each extracted sub-graph corresponds to one relationship and, hence, one explanation. FIG. 7(a) provides exemplary types of constraints that can be used in identifying explanation candidates, according to an embodiment of the present teaching. There are two exemplary categories of constraints, one corresponding to a non-redundant criterion 705 and the other corresponding to a non-decomposable criterion 710. The redundancy criterion 705 may reflect the condition that there is no node or link in a graph whose existence does not give rise to an additional relationship between the given entities. In this case, any such node or link is redundant. FIG. 7(b) illustrates an example of redundancy. In FIG. 7(b), node V2 725 is linked to node V0 735 but not to any of the two nodes (720 and 730) that represent the entities in the relationship. That is, node v2 725 is a redundant node and the link connected thereto is a redundant link. In general, to ensure that there is no redundancy, each node and link in a graph needs to be on a simple path connecting the two entity nodes (720 and 730 in this example).

Figure 7C:
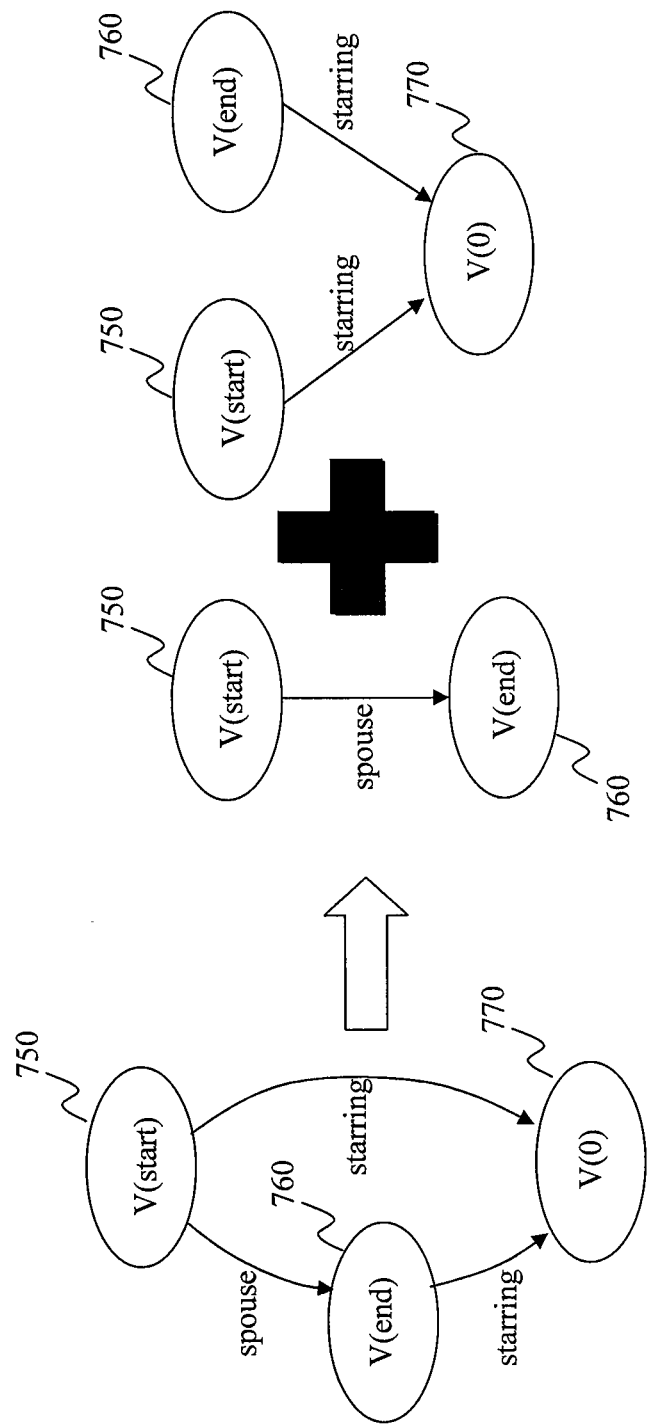

FIG. 7(c) illustrates an example of a decomposable graph representing some relationships between two entities represented by nodes 750 and 760 and its decompositions, according to an embodiment of the present teaching. The graph on the left has three nodes, 750, 760, and 770, representing two target entities (750 and 760) and a performance (770). The links connecting the target entities include "spouse" between nodes 750 and 760 and "starring" connecting two target entity nodes, 750 and 760, and the performance node 770 (in which the two target entities co-starred. Clearly, this graph represents multiple relationships, including one spousal relationship and one co-starring relationship between the two target entities. In this situation, the graph to the left of an arrow can be decomposed into two sub-graphs to the right of the arrow, one corresponding to the spousal relationship and the other corresponding to the co-starring relationship. In some embodiments, the goal is to get sub-graphs that are no longer decomposable so that each sub-graph represents only one relationship. In this manner, the explanation to be generated for each sub-graph explains one relationship (rather than multiple relationships).

To represent relationships, different explanation modeling languages may be employed. Examples include path based explanation models, graph based explanation models (as illustrated above), and min-multi-path (or MMP) based explanation models. In some embodiments, the modeling language used for representing explanations needs to have expressive power without redundancy and decomposability. Different types of explanation models may have different ranges of features in terms of expressive power, redundancy, or decomposability, etc. In general, when a path model is used to represent explanations, it does not possess the expressive power needed for explanations even though it is not redundant and not decomposable. A graph model has the expressive power for explanations but is both redundant and decomposable. An MMP model not only possesses the expressive power but also without redundancy and decomposability. Thus, the MMP provides the desired properties in terms of representing explanations. However, in implementing the present teaching, any appropriate models may be used even though some may not possess all the desired properties. Additional processing may be applied to get around the problem. For example, if a graph is used to model explanations, the undesired redundancy and decomposability (as shown above in FIG. 7(b)) may be removed through additional processing so that redundant node/links can be removed (in case of redundancy) or parts of the graph can be extracted by decomposing the graph (in case of decomposability) to yield sub-graphs that do not have undesired properties.

In some embodiments, information or attributes associated with a removed node may be informative and can be used to augment the attributes of a retained node or link so that the explanation will includes that information. For example, in FIG. 6(c), node 680 representing director Sam Mendes is redundant in explaining the relationship between Kate Winslet and Leonardo DiCarprio. The fact that movie Titanic co-starred by both Kate Winslet and Leonardo DiCarprio, represented by node 660 and 670, is directed by director Sam Mendes, represented by node 680 may be an interesting piece of information. In this case, in removing the redundancy (by removing node 680), the process may selectively remain this piece of information from the removed node and padded to the attributes to the node representing movie Titanic so that the explanation derived from this sub-graph is enriched.

Referring back to FIG. 4(b), the operation of generating explanations for relationships corresponds to a process of identifying instances of an abstract representation of relationship types involving the entities in question. For example, if an inquiry is "how are Tom Cruise and Nicole Kidman are related", the two entities in question are Tom Cruise and Nicole Kidman. In some embodiments, the process of generating the explanation in terms of how they are related is to identify instances of sub-graph(s) (each of which represents a particular type of relationship) that have Tom Cruise and Nicole Kidman as target nodes included therein. In addition, in some embodiments, based on what is known about Tom Cruise and Nicole Kidman (e.g., they are actors, which may be determined by the inquiry processing unit 420), a number of abstract graphs (see, e.g., FIGS. 5(a) and 5(b)) representing certain relationships that may exist between the two given entities (e.g., "spouse", "co-starring", etc.) may be identified (e.g., from storage 460). Such abstract graphs may then be used to match against graphs retrieved from, e.g., the knowledge database 250, to extract instances of sub-graphs that match any of the abstract graphs from 460 and that have their target nodes corresponding to Tom Cruise and Nicole Kidman. This matching and extracting process is performed by the explanation candidate identification unit 430, which may also control, in accordance with various identification criteria, e.g., non-redundancy and non-decomposability, to ensure that each of the extracted sub-graphs represents a single relationship between Tom Cruise and Nicole Kidman. FIGS. 6(*a*) and 6(*b*) illustrate two of such extracted sub-graphs each of which matches an abstract graph for a relationship type (see FIGS. 5(*a*) and 5(*b*)) and has its target nodes corresponding to the two entities in question (Tom Cruise and Nicole Kidman).

In some embodiments, different explanations for relationships existing between entities in question may also be derived based on, e.g., explanation enumeration, which may correspond to a process in which all relationships existing in one graph (e.g., FIG. 6(*c*)) can be identified, one at a time, by enumerating the graphs that represent the relationships. This is performed by the explanation enumeration unit 440. In the graph shown in FIG. 7(*b*), there are multiple relationships (explanations) embedded therein. The sub-graphs of this graph can be enumerated so that each distinct relationship involving the entities can be identified, e.g., V(start)-V1-V0-V(end) is a sub-graph corresponding to the first relationship ("co-starring"), V(start)-V0-V1-V(end) is a sub-graph corresponding to the second relationship, and V(start)-V0-V1-V(end) is a sub-graph corresponding to the third relationship. In some embodiments, certain enumeration rules (480) may be employed to control the enumeration process. Details related to explanation enumeration are discussed with reference to FIGS. 9-10.

Once all the relationships existing between the entities in question are identified, the explanation description unit 450 creates, based on information from different sources, a description for each relationship explanation. Such a description may be formed in different media or forms and in some embodiments may be created based on the bandwidth permitted on the device of a user on which the explanations are to be presented. For example, if it is known that the device that is going to receive the explanation is a hand held device with limited bandwidth, multimedia form of explanation may not be created or transmitted. Details related to explanation description generation are provided with reference to FIGS. 11-13.

Figure 8:
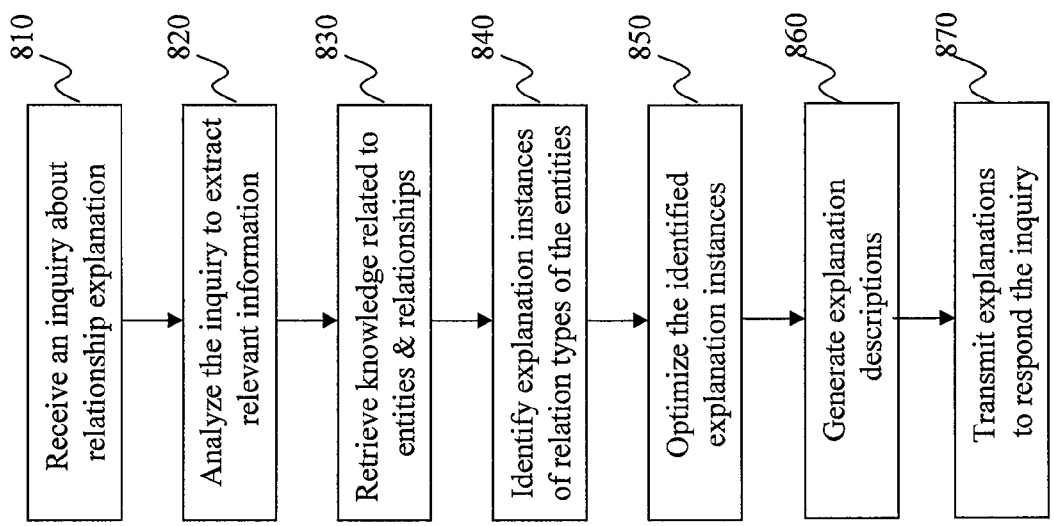
FIG. 8 is a flowchart of an exemplary process in which a relationship engine operates to provide relationship explanations, according to an embodiment of the present teaching.

FIG. 8 is a flowchart of an exemplary process in which the relationship explanation engine 240 operates to provide relationship explanations, according to an embodiment of the present teaching. An inquiry about how different entities are related is received at 810. The inquiry is analyzed, at 820, so that relevant information, e.g., the entities in question, can be extracted. Knowledge stored in knowledge database 250 is then retrieved, at 830, based on the entities in question. Such knowledge may include information about different entities or relationships among different entities known to exist. In some embodiments, it is also possible that what is retrieved from the knowledge database 250 may also be determined based on abstract types of relationships applicable to the entities in question.

Based on the retrieved knowledge, relationship explanations are identified at 840 and may be further optimized at 850 (e.g., remove redundancies or duplicates, etc.). For each of such identified relationship explanations, a description may be generated at 860. A description for an explanation may be a paragraph of textual characterization of a relationship between two entities. For example, an explanation of a spousal relationship between two people may include the year they were married, the location of the wedding, or some highlights in their marriage obtained from different information sources.

A description of an explanation may also be a short video clip of a, e.g., a movie, in which two movie stars co-starred. At 870, such explanations are transmitted to the user who initially sent the inquiry as a response to the inquiry.

Figure 9:
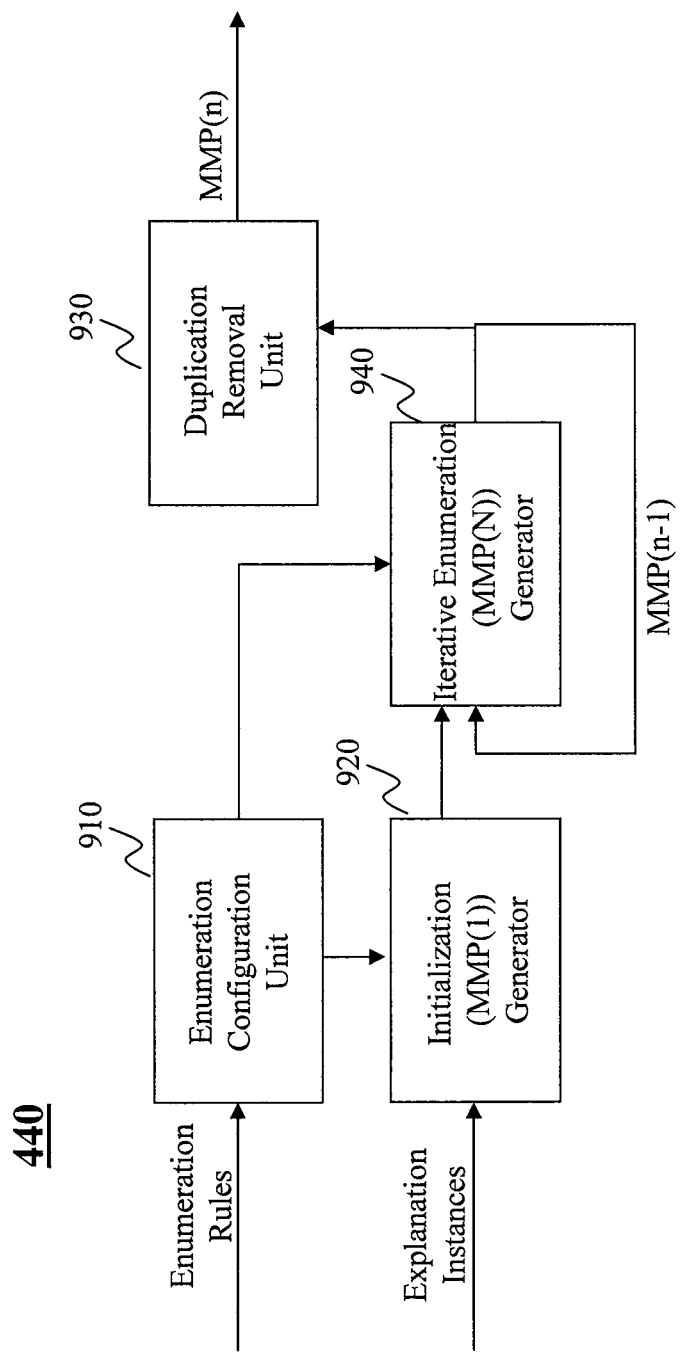
FIG. 9 depicts a high level exemplary system diagram of an explanation enumeration unit, according to an embodiment of the present teaching.

FIG. 9 depicts a high level exemplary system diagram of the explanation enumeration unit 440, according to an embodiment of the present teaching. In this illustrated embodiment, the enumeration is applied to an MMP representing relationship explanations. In general, an MMP is a set of MMPs, i.e., {MMP(1), MMP(2), . . . , }. An MMP(n) with a given length restriction can be enumerated iteratively. That is. if MMP(1) corresponds to a path, then MMP(n)=MMP(n−1)+MMP(1). FIG. 9 shows a system diagram for the enumeration unit 440 that implements MMP enumeration. In this example, the explanation enumeration unit 440 comprises an enumeration configuration unit 910, an initialization generator 920 for generating MMP(1), and an iterative enumeration generator 940 that generates MMP(i)=MMP(i−1)+MMP(1), $1<i<=n$. Here, n corresponds to a processing parameter configured by, e.g., the enumeration configuration unit 910 based on, e.g., the enumeration rules stored in 480 in FIG. 4(*b*). Optionally, there may also include a duplication removal unit 930 configured for detecting and removing any potential duplicated relationship explanations.

Figure 10:
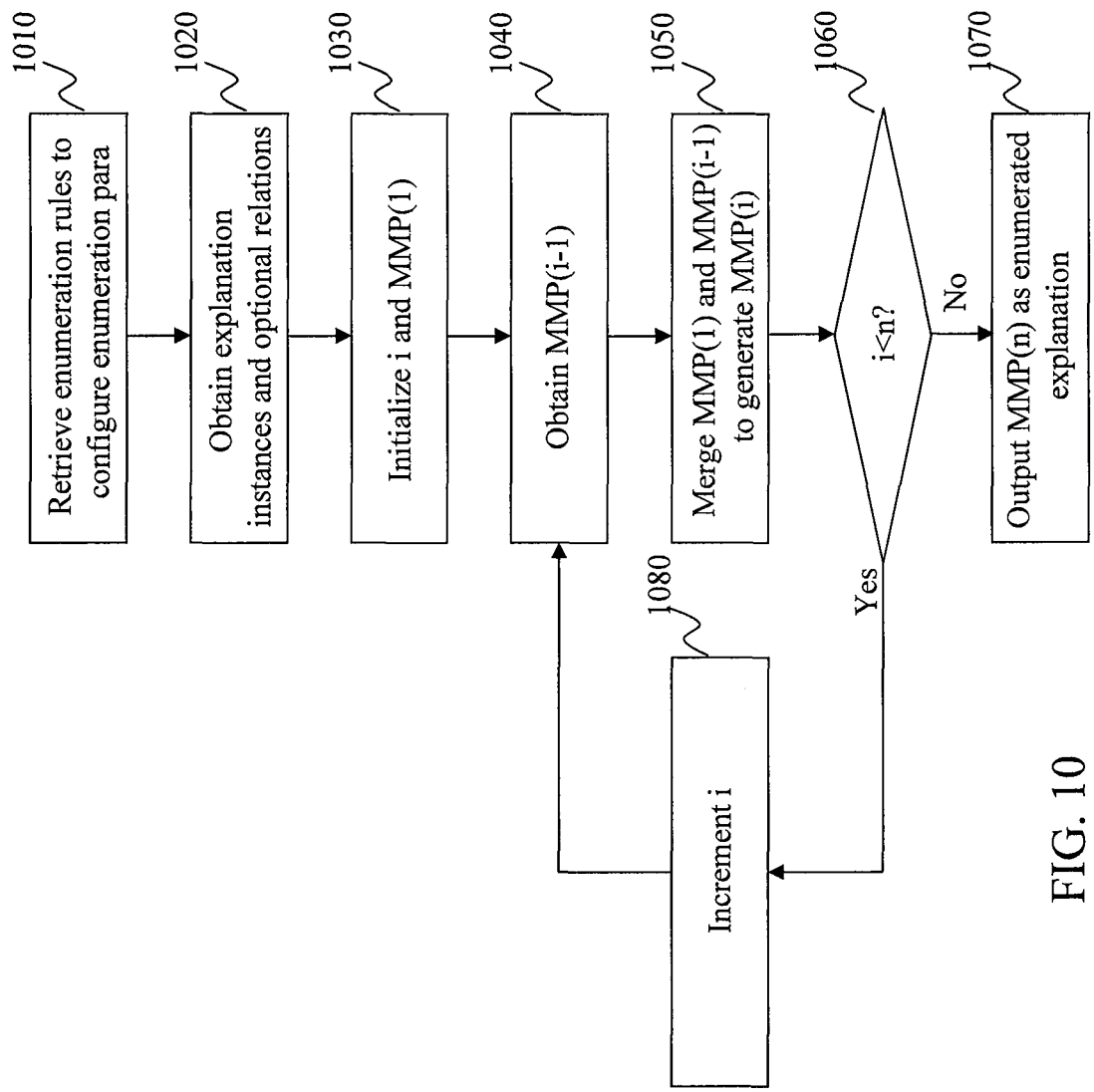
FIG. 10 is a flowchart of an exemplary process in which an explanation enumeration unit operates to generate one or more explanations for given entities, according to an embodiment of the present teaching.

FIG. 10 is a flowchart of an exemplary process in which the explanation enumeration unit 440 operates to generate one or more explanations for given entities, according to an embodiment of the present teaching. At 1010, enumeration rules stored in 480 are retrieved so that the enumeration parameters can be configured, e.g., the number of iterations or n to be applied. Input relationship explanation graphs are obtained at 1020. Optionally, in some embodiments, input relationship from the relationship database 490 may also be obtained as input. To enumerate the relationship explanations in the input graph, the initialization generator 920 initializes, at 1030, the iteration parameter i and the initial MMP(1). At 1040, MMP (i−1) is obtained, which is then used, together with MMP(1), to derive, at 1050, MMP(i)=MMP(i−1)+MMP(1). It is then determined, at 1060, whether the iteration of the enumeration process reaches the specified parameter n. If it has not reached n, the iteration parameter i is incremented by 1 and MMP(i−1) based on the updated i is obtained at 1040. The process continues until all n iterations are completed. In this case, the output MMP(n) corresponds to the enumerated relationship explanations and is output at 1070.

Figure 11:
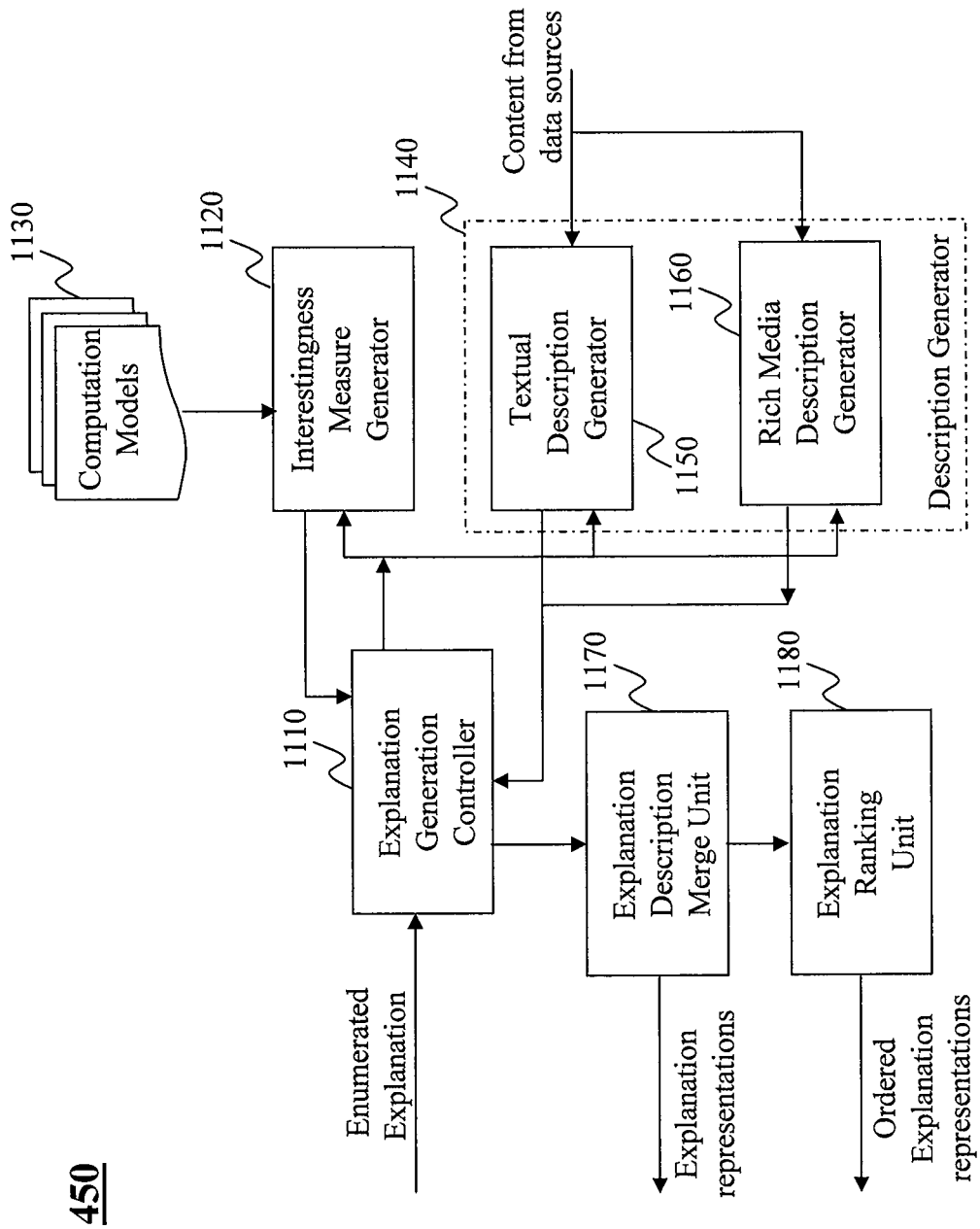
FIG. 11 depicts a high level exemplary system diagram of an explanation description generator, according to an embodiment of the present teaching.
Figure 12:
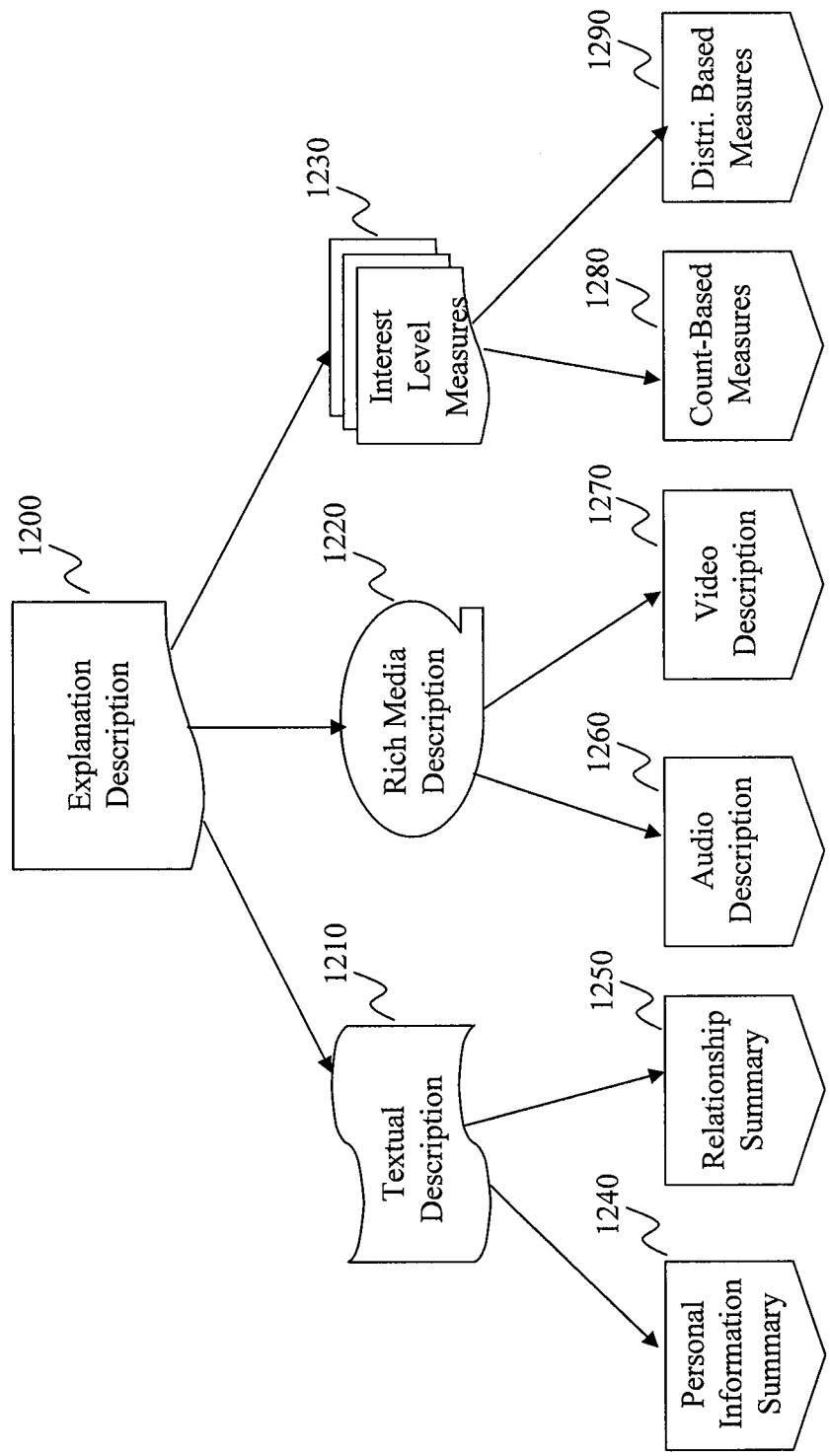
FIG. 12 shows exemplary types of information included in an explanation description, according to an embodiment of the present teaching.

FIG. 11 depicts a high level exemplary system diagram of the explanation description unit 450, according to an embodiment of the present teaching. For each explanation, besides the connection existing between the entities in question and the annotation of the link (e.g., co-starring), more may be presented to enrich the description of the relationship. For instance, for given entities Brad Pitt and Angelina Jolie, a segment of text that explains their relationship as domestic partners may briefly describe how they met, when they got together, when they made their relationship public, when they had their first child and subsequently the twins, and how many adopted children they have, etc. In addition, if two people co-starred in a movie, a clip of the movie they co-starred in may also be displayed to enrich a user's online experience. FIG. 12 shows exemplary types of information that may be generated and included as a description of an explanation, according to an embodiment of the present teaching. A description for an explanation 1200 may include one or more of a textual description 1210, some rich media description 1220, and some indication of the level of interestingness of the explanation 1230. The textual description 1210 may also include a summary of personal information of the entities in question 1240 or a summary of the underlying relationship that gives rise to the explanation 1250. Rich media description 1220 may include audio description 1260 (e.g., a piece of a famous speech given by one or two of the entities in question), a visual description which can be a static picture or a graph representation in terms of how different entities are related (not shown) or a multimedia description such as a clip of video 1270. Measures indicating the level of interestingness of the explanation 1230 may include one or more indicators derived based on, e.g., different measures computed using corresponding approaches, e.g., count-based measures 1280 or distribution based measures 1290 (which will be discussed below).

To provide the above discussed forms of description for an explanation, the explanation description unit 450 comprises an explanation generation controller 1110, an explanation description merge unit 1170 that merges multiple types of descriptions for each explanation, one or more modules (e.g., 1120, 1150, and 1160) each of which generates a specific type of explanation description, and, optionally, an explanation ranking unit 1170 that may rank multiple relationship explanations in an order according to, e.g., the level of interestingness of the relationship. In this illustrated embodiment, an interestingness measure generator 1120 is used to compute a measure, for each relationship, to indicate how interesting the relationship is. A textual description generator 1150 is for generating a piece of text to explain the associated relationship. In addition, a rich media description generator 1160 may be deployed to generate a multimedia form of description for the underlying explanation. Both the textual description generator 1150 and the rich media description generator 1160 may access information from different data sources and compose them in a manner that is semantically consistent with the underlying explanation. For example, to explain the domestic partnership relationship between Brad Pitt and Angelina Jolie, information from different sources may be obtained in order to describe a history in terms of how they met, when they became domestic partners, and what happened after they became partners. In addition, in explaining a co-starring relationship between Tom Cruise and Nicole Kidman, besides the textual description of the movie they co-starred in, e.g., "The Days of Thunder", a video clip of a few representative scenes from that movie may be played back to a user.

In some embodiments, the interestingness measure for the relationships between different entities may be computed. Such a measure indicates the degree of relatedness between the entities. For instance, two entities may be simply related by an accidental encounter. Two entities may also be related in a multi-facet manner. For example, Brad Pitt and Angelina Jolie are related both professionally (co-starred in movie) and personally (they are domestic partners). Such computation may be controlled or configured based on one or more computation models stored in 1130. In some embodiments, a measure based on aggregation may be used to measure the interestingness of an explanation. For instance, the interestingness of an explanation between entities may be computed based on an aggregated count. Intuitively, if an explanation is "co-starring", the more instantiations this explanation has, the more interesting the explanation is. So, if two entities in question involve Tom Cruise and Brad Pitt and one explanation for their relationship is "co-starring", then the more movies they co-starred in, the more interesting the explanation about Tom Cruise co-starring with Brad Pitt will be. A simple count of the number of instances (or instantiations) for an explanation (e.g., count(co-starring, Tom Cruise, Brad Pitt)) may be used as a measure of interestingness. For example, if there are three explanation instances, the count is three.

In some embodiments, a distribution based measure may also be used to reflect the interestingness of an explanation. A distribution based approach captures the "rarity" of an explanation. In general, the more rare an explanation is, the more interesting it is. A distribution based computation model for interestingness may be further divided into a local distribution based measure and a global distribution based measure. With the local distribution based approach, the interestingness is measured by comparing the number of instances when both entities are instantiated with the number of instances when only one entity is instantiated. For example, count (co-starring, Tom Cruise, Nicole Kidman) is compared with count(co-starring, Tom Cruise, *), where "*" indicates anyone or no specific restriction as to whom Tom Cruise co-starred with. In this example, assume count (co-starring, Tom Cruise, Nicole Kidman)=4 and count(co-starring, Tom Cruise, *)=4+2+1=7, indicating that Tom Cruise co-starred with Nicole Kidman 4 times, with Brad Pitt 2 times, and with George Clooney 1 time, respectively. The level of interestingness of Tom Cruise co-starred with anyone or (co-starring, Tom Cruise, *) is 7/3 and the level of interestingness of Tom Cruise co-starred with Nicole Kidman or (co-starring, Tom Cruise, Nicole Kidman) is 4/1=4. The level of interestingness by such comparison can be normalized by taking, e.g., a ratio of the two counts. The above example shows that the explanation that Tom Cruise co-starred with Nicole Kidman is interesting because the count for that is much higher than that of the interestingness level of the explanation that Tom Cruise co-starred with others. Intuitively, it is much more rare for a person to co-star with another person 4 times and therefore, it makes this explanation more interesting.

In a global distribution based approach, the interestingness is measured by comparing the number of instances when both entities are instantiated with the number of instances when no given entity is instantiated, e.g., comparing count(co-starring, Tom Cruise, Nicole Kidman) and count(co-starring, *, *). That is, it reflects how rare is this explanation existing between these entities as compared with the general population. For example, if Tom Cruise and Nicole Kidman co-starred only with each other and never did that with anyone else, the explanation that these two actors co-starred together is a very interesting explanation.

It is understood that, although exemplary measurements reflecting the interestingness of an explanation are described herein, they are by ways of example rather than limitation. Any other appropriate and reasonable measurements can be employed to provide an indication of the value of an explanation and they will be all within the scope of the present teaching.

In addition to generating measures to describe the interestingness of each explanation, the present teaching also generates other forms of description for each explanation. As discussed herein, the textual description generator 1150 is used to provide a textual description about the explanation and the rich media description generator 1160 may be deployed to provide auditory, visual, or multimedia forms of explanation. To retrieve appropriate materials to compose such descriptions, semantic based analysis may be needed, which can then be used to guide from where and which piece of information is to be obtained. In addition, based on such obtained information, intelligence may also be applied to appropriately integrate relevant information to generate a seamless presentation with a focus tied to the underlying relationship that gives rise to the explanation. For example, if the explanation is keyed on the "spousal" relationship, information related to a movie director that one of the entities worked with may not be relevant and may not be incorporated. Existing technologies may be employed to implement the process of generating textual or multimedia descriptions for an explanation. It is understood that those are part of the present teaching and fall within the scope of the present teaching.

The explanation generation controller 1110 controls the processing related to generating a description for each explanation. According to some configuration of a particular implementation of the present teaching, the explanation generation controller 1110 may appropriately invoke the interestingness measure generator 1120, the textual description generator 1150, and the rich media description generator 1160 to produce corresponding descriptions. Based on the results from those processing modules, the explanation generation controller 1110 invokes the explanation description merge unit 1170 to produce an overall description for each explanation. For instance, different aspects of the description for each explanation may be packed in an appropriate data structure so that it can be indexed or embedded with the explanation itself in order for the explanation to be transmitted to a requesting user. The controller 1110 may also incorporate other information such as parameters related to the display of the explanation and its descriptions and send to the merge unit 1170 to be incorporated.

In some embodiments, the merge unit 1170 may forward relevant information, e.g., the interestingness measure(s), for all the explanations associated with the same inquiry to the explanation ranking unit 1180 so that the explanations associated with the same inquiry can be sorted according to, e.g., the level of interestingness. Such ranking information may then be sent back to the explanation description merge unit 1170 to be packed with the response to the inquiry so that the explanations can be displayed in an order based on the ranking. The system can also be configured to send out either the ranked or unranked explanations. The final explanation (with description and/or ranking) may be sent out either from the explanation description merge unit 1170 or from the explanation ranking unit 1180.

Figure 13:
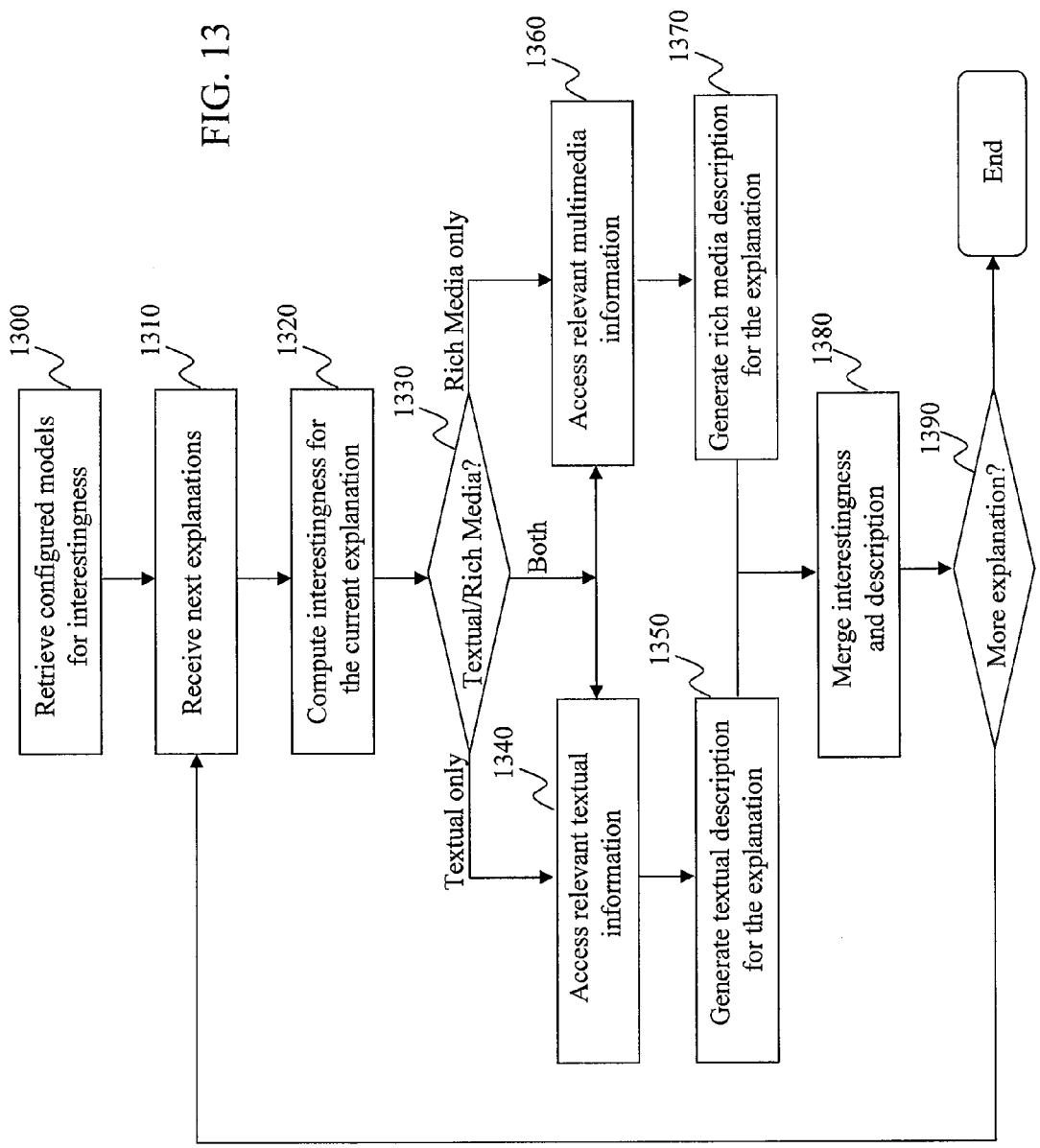
FIG. 13 is a flowchart of an exemplary process in which an explanation description generator operates to create a description for each explanation associated with given entities, according to an embodiment of the present teaching.

FIG. 13 is a flowchart of an exemplary process in which an explanation description generator operates to create a description for each explanation associated with given entities, according to an embodiment of the present teaching. Models used for computing interestingness for each explanation may first be retrieved at 1300. This step may be made optional if there is a fixed model built in a system or the system is specifically configured to utilize a certain computation model for the interestingness measure. The configuration of the system may be made based on the needs of the underlying application. To generate a description for each explanation, the system may enumerate, one explanation at a time at 1310, to process each explanation. In some embodiments, parallel processing may also be employed, in which multiple explanations may be processed at the same time to generate descriptions.

In the exemplary process, for each explanation, a measure for the interestingness of the explanation may first be computed at 1320. To proceed with generation of a description, it is determined, at 1330, which type of description is to be generated. If a textual description is to be generated, text information relevant to the explanation is accessed at 1340 and used to generate, at 1350, a textual description for the explanation. If a rich media description is to be generated, rich media information related to the explanation is to be accessed, at 1360, and used to generate, at 1370, a rich media description for the explanation. The generated textual and rich media descriptions, together with the interestingness measure computed, may then be combined, at 1380, to produce an integrated description. In some embodiments, multiple interestingness measures may be computed and then integrated to generate an overall measure via, e.g., averaging, weighted sum, or any other combination scheme. The computation of is process continues, determined at 1390, to process each and every explanation.

To implement the present teaching, computer hardware platforms may be used as the hardware platform(s) for one or more of the elements described herein (e.g., the inquiry processing unit 420, the knowledge retrieval unit 410, the explanation generator 435, and the explanation description unit 450). The hardware elements, operating systems and programming languages of such computers are conventional in nature, and it is presumed that those skilled in the art are adequately familiar therewith to adapt those technologies to implement the DCP processing essentially as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 14:
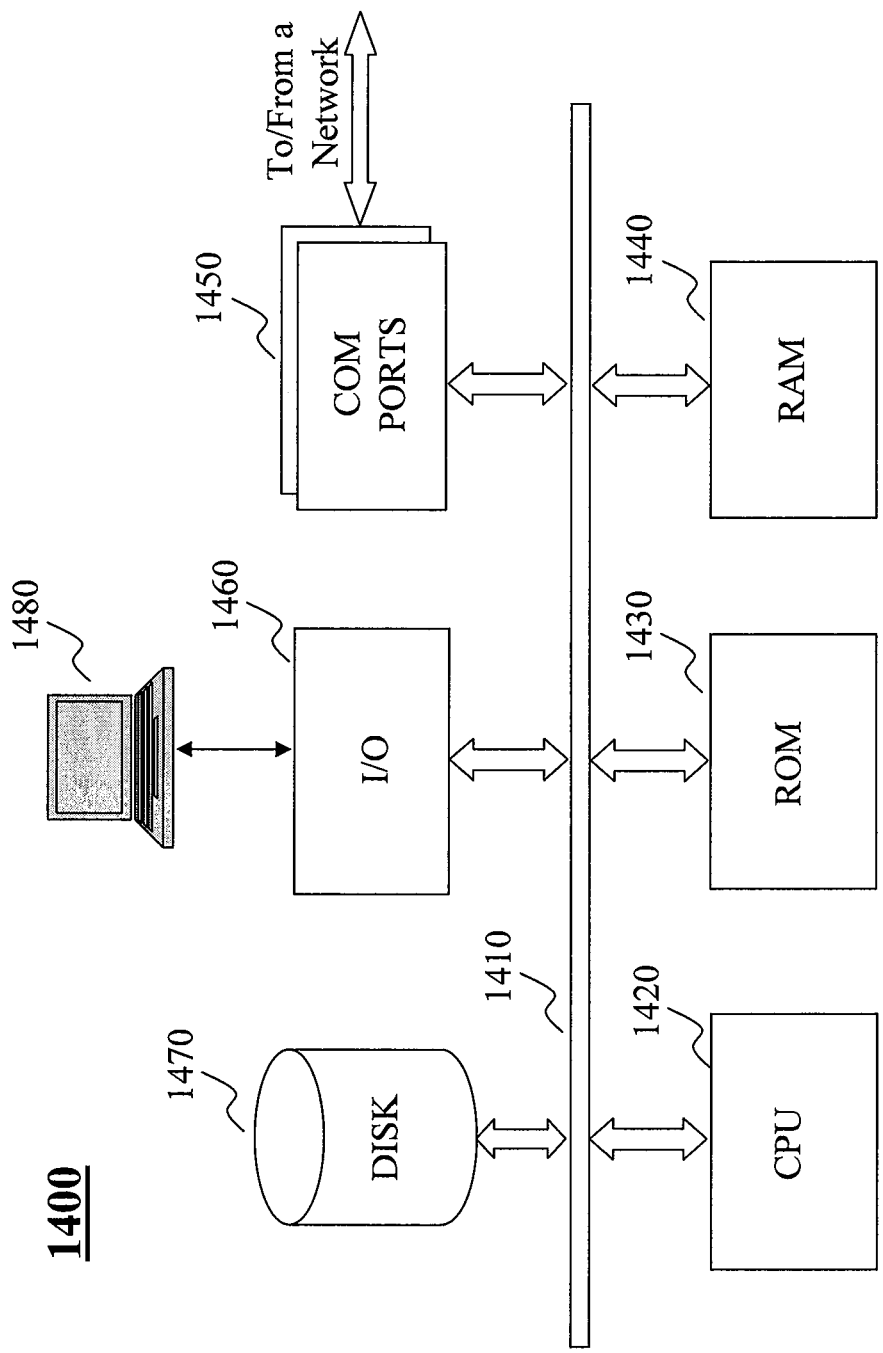
FIG. 14 depicts a general computer architecture on which the present teaching can be implemented.

FIG. 14 depicts a general computer architecture on which the present teaching can be implemented and has a functional block diagram illustration of a computer hardware platform which includes user interface elements. The computer may be a general purpose computer or a special purpose computer. This computer 1400 can be used to implement any components of the dynamic web page generation architecture as described herein. For example, the inquiry processing unit 420 that process an inquiry about how entities are related, the knowledge retrieval unit 410 that retrieves knowledge appropriate given the entities in question based on the inquiry, the explanation generator 435 identifies explanations of relationships existing between the entities in question, and the explanation description unit 450 that produces descriptions for each and every explanation to enrich the users' online experience, can all be implemented on a computer such as computer 1400, via its hardware, software program, firmware, or a combination thereof. Although only one such computer is shown, for convenience, the computer functions relating to dynamic relation and event detection may be implemented in a distributed fashion on a number of similar platforms, to distribute the processing load.

The computer 1400, for example, includes COM ports 1450 connected to and from a network connected thereto to facilitate data communications. The computer 1400 also includes a central processing unit (CPU) 1420, in the form of one or more processors, for executing program instructions. The exemplary computer platform includes an internal communication bus 1410, program storage and data storage of different forms, e.g., disk 1470, read only memory (ROM) 1430, or random access memory (RAM) 1440, for various data files to be processed and/or communicated by the computer, as well as possibly program instructions to be executed by the CPU. The computer 1400 also includes an I/O component 1460, supporting input/output flows between the computer and other components therein such as user interface elements 1480. The computer 1400 may also receive programming and data via network communications.

Hence, aspects of the methods of receiving user queries and returning a response, e.g., a URL associated with dynamically generated web pages or the content contained in the dynamically generated web pages, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the search engine operator or other explanation generation service provider into the hardware platform(s) of a computing environment or other system implementing a computing environment or similar functionalities in connection with generating explanations based on user inquiries. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the dynamic relation/event detector and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for providing one or more explanations, comprising the steps of:

receiving, via the communication platform, a set of entities;

retrieving, by a knowledge retrieval unit, information in accordance with the set of entities, wherein the information includes relationships among the set of entities, and the set of entities includes a pair of entities that are connected via a plurality of relationships;

generating, by an explanation generation unit, one or more explanations for each of the plurality of relationships based on the retrieved information, wherein each of the explanations provides a description of a corresponding relationship, the description includes a characterization of degree of relatedness of the explanation, and the degree of relatedness is higher when a number of explanation instances identified with respect to the explanation is larger; and transmitting the one or more explanations.

2. The method of claim 1, wherein the step of generating one or more explanations comprises:

enumerating a plurality of explanation candidates and/or an optional set of dynamic relationships based on a set of pre-defined conditions to produce the one or more explanations.

3. The method of claim 2, wherein the step of enumerating comprises the steps of:

retrieving enumeration rules to configure parameters to be used in an enumeration process;

obtaining the plurality of explanation candidates and/or the optional set of dynamic relationships;

iteratively enumerating the plurality of explanation candidates and/or the optional set of dynamic relationships based on the parameters configured in accordance with the enumeration rules to produce an enumeration result; and removing any duplication existing in the enumeration result to yield the one or more explanations.

4. The method of claim 1, further comprising the step of generating, by an explanation description unit, a representation for each of the one or more explanations, wherein the representation for each explanation comprises at least one of a measure characterizing a degree of interestingness of the explanation and a characterization of the explanation.

5. The method of claim 4, wherein the characterization of an explanation includes at least one of a textual description and a rich media description.

6. The method of claim 4, wherein the measure characterizing a degree of interestingness is computed based on at least one of:

a count-based measure computed based on a number of explanation instances identified with respect to the set of entities; and a distribution-based measure computed based on a comparison between a first number of explanation instances instantiated using all entities included in the set of entities and a second number of explanation instances instantiated using some of the entities included in the set of entities.

7. The method of claim 1, wherein the explanations for the plurality of relationships are ranked based on their corresponding degrees of relatedness.

8. A method, implemented on a machine having at least one processor, storage, and a communication platform connected to a network for providing explanations, comprising the steps of:
receiving, via the communication platform, an inquiry about how a set of entities are related from a search engine, where the inquiry is generated based on a query result provided by the search engine;
retrieving, by a knowledge retrieval unit, information in accordance with the set of entities, wherein the information includes relationships among the set of entities, and the set of entities includes a pair of entities that are connected via a plurality of relationships;
generating, by an explanation generation unit, one or more explanations for each of the plurality of relationships based on the retrieved information, wherein each of the explanations provides a description of a corresponding relationship, the description includes a characterization of degree of relatedness of the explanation, and the degree of relatedness is higher when a number of explanation instances identified with respect to the explanation is larger; and
transmitting the one or more explanations to the search engine as a response to the inquiry.

9. A method, implemented on a machine having at least one processor, storage, and a communication platform connected to a network for providing explanations, comprising the steps of:
receiving, via the communication platform, an inquiry from a user about how a set of entities are related, where the inquiry is issued based on content accessible to the user;
retrieving, by a knowledge retrieval unit, information in accordance with the set of entities, wherein the information includes relationships among the set of entities, and the set of entities includes a pair of entities that are connected via a plurality of relationships;
generating, by an explanation generation unit, one or more explanations for each of the plurality of relationships based on the retrieved information, wherein each of the explanations provides a description of a corresponding relationship, the description includes a characterization of degree of relatedness of the explanation, and the degree of relatedness is higher when a number of explanation instances identified with respect to the explanation is larger; and
transmitting the one or more explanations to the user as a response to the inquiry.

10. A method, implemented on a machine having at least one processor, storage, and a communication platform connected to a network for a search engine, comprising the steps of:
receiving, via the communication platform, a query from a user;
searching, via the network, for content based on the query;
sending the searched content to the user as a response to the query;
receiving, via the communication platform, an inquiry from the user about how a set of entities, identifiable from the content, are related, wherein the set of entities includes a pair of entities that are connected via a plurality of relationships;
sending the inquiry to a relationship explanation engine that provides explanations to relationships existing among entities based on information relating to the entities, wherein each of the explanations provides a description of a corresponding relationship, the description includes a characterization of degree of relatedness of the explanation, and the degree of relatedness is higher when a number of explanation instances identified with respect to the explanation is larger; and
receiving, from the relationship explanation engine, one or more representations of explanations, wherein each representation of an explanation includes at least one of an explanation, a description of the explanation, and a measure indicating the interestingness of the explanation;
transmitting, via the communication platform, the one or more representations of explanations to the user as a response to the inquiry.

11. A method, implemented on a machine having at least one processor, storage, and a communication platform connected to a network for a search engine capable of providing explanations, comprising the steps of:
receiving, via the communication platform, a query from a user;
searching, via the network, for content based on the query;
sending the searched content to the user as a response to the query;
receiving, via the communication platform, an inquiry from the user about how a set of entities, identifiable from the content, are related, wherein the set of entities includes a pair of entities that are connected via a plurality of relationships;
retrieving, by a knowledge retrieval unit, information in accordance with the set of entities, wherein the information includes relationships among the set of entities;
generating, by an explanation generation unit, one or more explanations for each of the plurality of relationships based on the retrieved information, wherein each of the explanations provides a description of a corresponding relationship, the description includes a characterization of degree of relatedness of the explanation, and the degree of relatedness is higher when a number of explanation instances identified with respect to the explanation is larger; and
transmitting the one or more explanations to the user as a response to the inquiry.

12. A system having at least one processor and storage for providing explanations, comprising:
an inquiry processing unit implemented on the at least one processor that receives and processing an inquiry about how a set of entities are related;
a knowledge retrieval unit implemented on the at least one processor that retrieves information from a knowledge database in accordance with the set of entities, wherein the information includes relationships among the set of entities, and the set of entities includes a pair of entities that are connected via a plurality of relationships;
an explanation generation unit implemented on the at least one processor that generates one or more explanations for each of the plurality of relationships based on the retrieved information, wherein
each of the explanations provides a description of a corresponding relationship, the description includes a characterization of degree of relatedness of the explanation, and the degree of relatedness is higher when a number of explanation instances identified with respect to the explanation is larger, the explanation generation unit comprises an explanation candidate identification unit configured for identifying a plurality of explanation candidates based on at least one criterion, and each of the one or more explanations is generated according to one of the plurality of explanation candidates; and a communication platform that connects to a network for transmitting the one or more explanations as a response to the inquiry.

13. The system of claim 12, wherein the explanation generation unit further comprises:
an explanation enumeration unit that enumerates the plurality of explanation candidates and an optional set of dynamic relationships based on a set of pre-defined conditions to produce the one or more explanations.

14. The system of claim 13, wherein the explanation enumeration unit comprises:
an enumeration configuration unit that obtains enumeration rules to be used to configure the enumeration process;
an initialization generator that receives the plurality of explanation candidates to produce an initial state of the enumeration process;
an iterative enumeration generator that iteratively enumerates the plurality of explanation candidates and/or the optional dynamic relationships based on the parameters configured in accordance with the enumeration rules to produce an enumeration result; and
a duplication removal unit that removes any duplication existing in the enumeration result to yield the one or more explanations.

15. The system of claim 12, further comprising an explanation description unit that generates a representation for each of the one or more explanations, wherein the explanation description unit comprises:
an interestingness measure generator that computes a measure characterizing a degree of interestingness of an explanation;
a description generator that computes a description characterizing the explanation; and
an explanation description merge unit that integrates the measure and the description to generate a representation of the explanation.

16. The system of claim 15, wherein the description generator comprises:
a textual description generator that generates a textual description for an explanation; and
a rich media description generator that generates a rich media description for an explanation.

17. The system of claim 15, further comprising an explanation ranking unit that ranks the one or more explanations based on the measure characterizing the degree of interestingness of each explanation.

18. A system having at least one processor and storage for providing explanations, comprising:
a search engine implemented on the at least one processor that provides query content obtained based on a query received from a user; and
a relationship explanation engine implemented on the at least one processor that provides one or more explanations about how a set of entities, identifiable in the query content, are related, wherein upon receiving an inquiry about how the set of entities are related, the relationship explanation engine:
retrieves information in accordance with the set of entities, wherein the information includes relationships among the set of entities, and the set of entities includes a pair of entities that are connected via a plurality of relationships,
generates one or more explanations for each of the plurality of relationships based on the retrieved information, wherein each of the explanations provides a description of a corresponding relationship, the description includes a characterization of degree of relatedness of the explanation, and the degree of relatedness is higher when a number of explanation instances identified with respect to the explanation is larger, and
transmits the one or more explanations as a response to the inquiry.

19. A machine-readable tangible and non-transitory medium having instructions for providing explanations recorded thereon, wherein the instructions, when read by the machine, cause the machine to perform the following:
receiving, via the communication platform, a set of entities;
retrieving information in accordance with the set of entities, wherein the information includes relationships among the set of entities, and the set of entities includes a pair of entities that are connected via a plurality of relationships;
generating one or more explanations for each of the plurality of relationships based on the retrieved information, wherein each of the explanations provides a description of a corresponding relationship, the description includes a characterization of degree of relatedness of the explanation, and the degree of relatedness is higher when a number of explanation instances identified with respect to the explanation is larger; and
transmitting the one or more explanations.

20. The medium of claim 19, wherein the step of generating one or more explanations comprises:
enumerating a plurality of explanation candidates and/or an optional set of dynamic relationships based on a set of pre-defined conditions to produce the one or more explanations.

21. The medium of claim 19, wherein the instructions, when read by the machine, further cause the machine to generate a representation for each of the one or more explanations,
wherein the representation for each explanation comprises at least one of a measure characterizing a degree of interestingness of the explanation and a characterization of the explanation.

22. The medium of claim 21, wherein the characterization of the explanation includes at least one of a textual description and a rich media description.

23. The medium of claim 21, wherein the measure characterizing a degree of interestingness is computed based on at least one of:
a count-based measure computed based on a number of explanation instances identified with respect to the set of entities; and
a distribution-based measure computed based on a comparison between a first number of explanation instances instantiated using all entities included in the set of entities and a second number of explanation instances instantiated using some of the entities included in the set of entities.

\* \* \* \* \*